(12) United States Patent
Fredette et al.

(10) Patent No.: US 10,630,591 B2
(45) Date of Patent: Apr. 21, 2020

(54) ADAPTIVE PRIVATE NETWORK ASYNCHRONOUS DISTRIBUTED SHARED MEMORY SERVICES

(71) Applicant: Talari Networks Incorporated, Cupertino, CA (US)

(72) Inventors: Andre N. Fredette, Cary, NC (US); John Edward Dickey, Apex, NC (US)

(73) Assignee: TALARI NETWORKS, INC., San Jose, CA (US)

( * ) Notice: Subject to any disclaimer, the term of this patent is extended or adjusted under 35 U.S.C. 154(b) by 0 days.

(21) Appl. No.: 16/383,262

(22) Filed: Apr. 12, 2019

(65) Prior Publication Data

US 2019/0273685 A1    Sep. 5, 2019

Related U.S. Application Data

(60) Division of application No. 15/180,478, filed on Jun. 13, 2016, now Pat. No. 10,305,803, which is a
(Continued)

(51) Int. Cl.
*H04L 12/44*    (2006.01)
*H04L 12/803*    (2013.01)
(Continued)

(52) U.S. Cl.
CPC .......... *H04L 47/122* (2013.01); *G06F 15/167* (2013.01); *H04L 7/0012* (2013.01);
(Continued)

(58) Field of Classification Search
CPC ... H04L 47/122; H04L 7/0012; H04L 43/062; H04L 43/0829; H04L 43/0858;
(Continued)

(56) References Cited

U.S. PATENT DOCUMENTS 5,943,675 A * 8/1999 Keith .................. G06F 12/0815
5,964,838 A   10/1999 Cheung et al.
(Continued)

OTHER PUBLICATIONS

Notice of Allowance for U.S. Appl. No. 15/180,478 (dated Jan. 17, 2019).
(Continued)

*Primary Examiner* — Sai Ming Chan
(74) *Attorney, Agent, or Firm* — Jenkins, Wilson, Taylor & Hunt, P.A.

(57) ABSTRACT

A highly predicable quality shared distributed memory process is achieved using less than predicable public and private internet protocol networks as the means for communications within the processing interconnect. An adaptive private network (APN) service provides the ability for the distributed memory process to communicate data via an APN conduit service, to use high throughput paths by bandwidth allocation to higher quality paths avoiding lower quality paths, to deliver reliability via fast retransmissions on single packet loss detection, to deliver reliability and timely communication through redundancy transmissions via duplicate transmissions on high a best path and on a most independent path from the best path, to lower latency via high resolution clock synchronized path monitoring and high latency path avoidance, to monitor packet loss and provide loss prone path avoidance, and to avoid congestion by use of high resolution clock synchronized enabled congestion monitoring and avoidance.

8 Claims, 11 Drawing Sheets

Related U.S. Application Data division of application No. 14/291,776, filed on May 30, 2014, now Pat. No. 9,392,061, which is a continuation of application No. 13/850,411, filed on Mar. 26, 2013, now Pat. No. 8,775,547, which is a continuation of application No. 13/208,825, filed on Aug. 12, 2011, now Pat. No. 8,452,846.

(60) Provisional application No. 61/372,904, filed on Aug. 12, 2010.

(51) Int. Cl.

| | |
|---|---|
| *G06F 15/167* | (2006.01) |
| *H04L 12/26* | (2006.01) |
| *H04L 29/08* | (2006.01) |
| *H04L 7/00* | (2006.01) |
| *H04L 12/727* | (2013.01) |
| *H04L 12/721* | (2013.01) |
| *H04L 12/729* | (2013.01) |

(52) U.S. Cl.
CPC .......... *H04L 43/062* (2013.01); *H04L 43/087* (2013.01); *H04L 43/0829* (2013.01); *H04L 43/0858* (2013.01); *H04L 43/0864* (2013.01); *H04L 43/16* (2013.01); *H04L 45/121* (2013.01); *H04L 45/124* (2013.01); *H04L 45/125* (2013.01); *H04L 67/1097* (2013.01)

(58) Field of Classification Search
CPC ... H04L 43/0864; H04L 43/087; H04L 43/16; H04L 45/121; H04L 45/124; H04L 45/125; H04L 67/1097; G06F 15/167
USPC ........................................................ 370/237
See application file for complete search history.

(56) References Cited

U.S. PATENT DOCUMENTS

| | | | |
|---|---|---|---|
| 6,055,545 A * | 4/2000 | Yazaki | ............... G06F 9/52 604/385.23 |
| 6,356,949 B1 | 3/2002 | Katsandres et al. | |
| 6,598,130 B2 | 7/2003 | Harris et al. | |
| 6,842,815 B2 | 1/2005 | Yim et al. | |
| 6,865,634 B2 | 3/2005 | McAllister | |
| 7,743,214 B2 | 6/2010 | Adams et al. | |
| 7,979,602 B2 | 7/2011 | Benveniste et al. | |
| 8,125,907 B2 | 2/2012 | Averi et al. | |
| 8,126,911 B2 | 2/2012 | Hu et al. | |
| 8,274,891 B2 | 9/2012 | Averi et al. | |
| 8,312,230 B2 | 11/2012 | Jacobs et al. | |
| 8,452,846 B2 | 5/2013 | Fredette et al. | |
| 8,456,530 B2 | 6/2013 | Zinevich | |
| 8,644,164 B2 | 2/2014 | Averi et al. | |
| 8,775,547 B2 | 7/2014 | Fredette et al. | |
| 9,392,061 B2 | 7/2016 | Fredette et al. | |
| 10,305,803 B2 | 5/2019 | Fredette et al. | |
| 2005/0086656 A1 * | 4/2005 | Whitlock | ................. G06F 9/52 718/1 |
| 2007/0121499 A1 | 5/2007 | Pal et al. | |
| 2009/0310485 A1 | 12/2009 | Averi et al. | |
| 2010/0037056 A1 | 2/2010 | Follis et al. | |
| 2016/0366060 A1 | 12/2016 | Fredette et al. | |

OTHER PUBLICATIONS

Non-Final Office Action for U.S. Appl. No. 15/180,478 (dated May 30, 2018).

Restriction Requirement for U.S. Appl. No. 15/180,478 (dated Dec. 15, 2017).

Commonly-assigned, co-pending U.S. Appl. No. 16/791,776 for "Adaptive Private Network Asynchronous Distributed Shared Memory Services," (Unpublished, filed Feb. 14, 2020).

* cited by examiner

ADAPTIVE PRIVATE NETWORK ASYNCHRONOUS DISTRIBUTED SHARED MEMORY SERVICES

PRIORITY CLAIM

This application is a divisional of U.S. patent application Ser. No. 15/180,478, filed on Jun. 13, 2006, which is a divisional of U.S. patent application Ser. No. 14/291,776 filed on May 30, 2014 (now U.S. Pat. No. 9,392,061), which is a continuation of U.S. patent application Ser. No. 13/850,411 filed on Mar. 26, 2013 (now U.S. Pat. No. 8,775,547), which is a continuation of U.S. patent application Ser. No. 13/208,825 filed on Aug. 12, 2011 (now U.S. Pat. No. 8,452,846), which claims the benefit of U.S. Provisional Patent Application Ser. No. 61/372,904 entitled "Adaptive Private Network Asynchronous Distributed Shared Memory Services" filed Aug. 12, 2010, the disclosures of all of which are hereby incorporated by reference in their entireties.

CROSS REFERENCE TO RELATED APPLICATIONS

U.S. patent application Ser. No. 13/592,460 filed on Aug. 23, 2012 (now U.S. Pat. No. 8,644,144), which is a continuation of U.S. patent application Ser. No. 13/353,693 filed on Jan. 19, 2012 (now U.S. Pat. No. 8,274,891), which is a continuation of U.S. patent application Ser. No. 12/482,766 filed Jun. 11, 2009 (now U.S. Pat. No. 8,125,907), all of which claim the benefit of U.S. Provisional Patent Application Ser. No. 61/060,846 entitled "Flow-based Adaptive Private Network with Multiple WAN-Paths" filed Jun. 12, 2008 have the same assignee as the present application, are related applications, and are hereby incorporated by reference in their entireties.

FIELD OF THE INVENTION

The present invention relates generally to improved network communication in loosely coupled computing systems. More specifically, the present invention relates to systems and methods for effectively employing distributed shared memory services for adaptive private networks.

BACKGROUND OF THE INVENTION

The introduction of frame relay in the early 1990's brought lower cost, higher bandwidth, improved reliability, and simpler management control to enterprise wide area networks (WANs) as compared to X.25 and point-to-point leased-line alternatives. Frame relay, together with single-source asynchronous transfer mode (ATM) and multiprotocol label switching (MPLS) services, still dominate the enterprise WAN market for corporate Internet traffic. However, these Internet-based services are not as reliable as processing systems at network nodes and are difficult to predict performance of network traffic. In addition, many networks experience disruptions and congestion on individual paths, for example, due to old equipment and marginal cable and connector conditions. Having such dependencies on single network paths, causes network outages and low performance even with new installations.

While performance, reliability, and predictability of a network has improved due to improvements in processor and communication architectures and implementations, the underlying networks and message passing protocols remain inefficient and hold back potential performance improvements.

SUMMARY OF THE INVENTION

Among its several aspects, the present invention addresses systems and techniques which improve performance, reliability, and predictability of networks without having costly hardware upgrades or replacement of existing network equipment. To such ends, an embodiment of the invention addresses a method for using distributed shared memory for communicating between loosely coupled computing systems. A first time is calibrated in a first node and a second time is calibrated in a second node based on a current time received from a network control point (NCP). A block of memory is transmitted from the first node over a first communication path to the second node and a duplicate block of memory is transmitted from the first node over a second communication path having a measure of independence from the first communication path to the second node that is greater than measured levels of independence of other available communication paths, wherein the block of memory and the duplicate block of memory are both tagged with a corresponding send time according to the calibrated first time. The block of memory or the duplicate block of memory is selected as the first block of memory received in the second node and tagged with an arrival time according to the calibrated second time, wherein the send time and arrival time of the first block of memory received in the second node are analyzed taking into account previous transmission measurements at the second node and used to generate a second node path quality report. The second node path quality report is transmitted from the second node to the first node, wherein path selection for transmission of a second block of memory is based on the second node path quality report.

Another embodiment addresses a method of sharing memory in a multiple parallel path network having disparate communication paths between a transmitting network node and a receiving network node. In a transmitting node a report on multiple disparate communication paths associated with the transmitting node is compressed to a compressed report. The compressed report having a transmission size exceeding a transmission capacity of a first communication path is fragmented into a first fragment and a second fragment. The first fragment is transmitted across the first communication path to a receiving node and the second fragment is transmitted across a second communication path having a measure of independence from the first communication path to the receiving node that is greater than measured levels of independence of other available communication paths. The first fragment and the second fragment are received in the receiving node as a combined compressed report. The combined compressed report is decompressed in the receiving node to the report, wherein report data from the report is used to adjust selection of communication paths.

Another embodiment addresses a method for adaptively sharing memory in a network utilizing characterizations of multiple disparate communication paths across the network which varies in transmission behavior frequently over time. Fragment packets of a block of memory are transmitted from a first node over a first path to a second node. The fragment packets of the block of memory are received in the second node. A potential lost packet incident is detected in the second node. A potential lost packet indication is transmitted in response to the potential lost packet incident from the second node over a second path to the first node and a duplicate potential lost packet indication is transmitted from the second node over a third path to the first node. The potential lost packet is speculatively retransmitted from the first node over a fourth path to the second node in response to the potential lost packet indication or the duplicate potential lost packet indication received first in the first node. The received fragment packets including the speculatively retransmitted potential lost packet are combined to recreate the block of memory.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
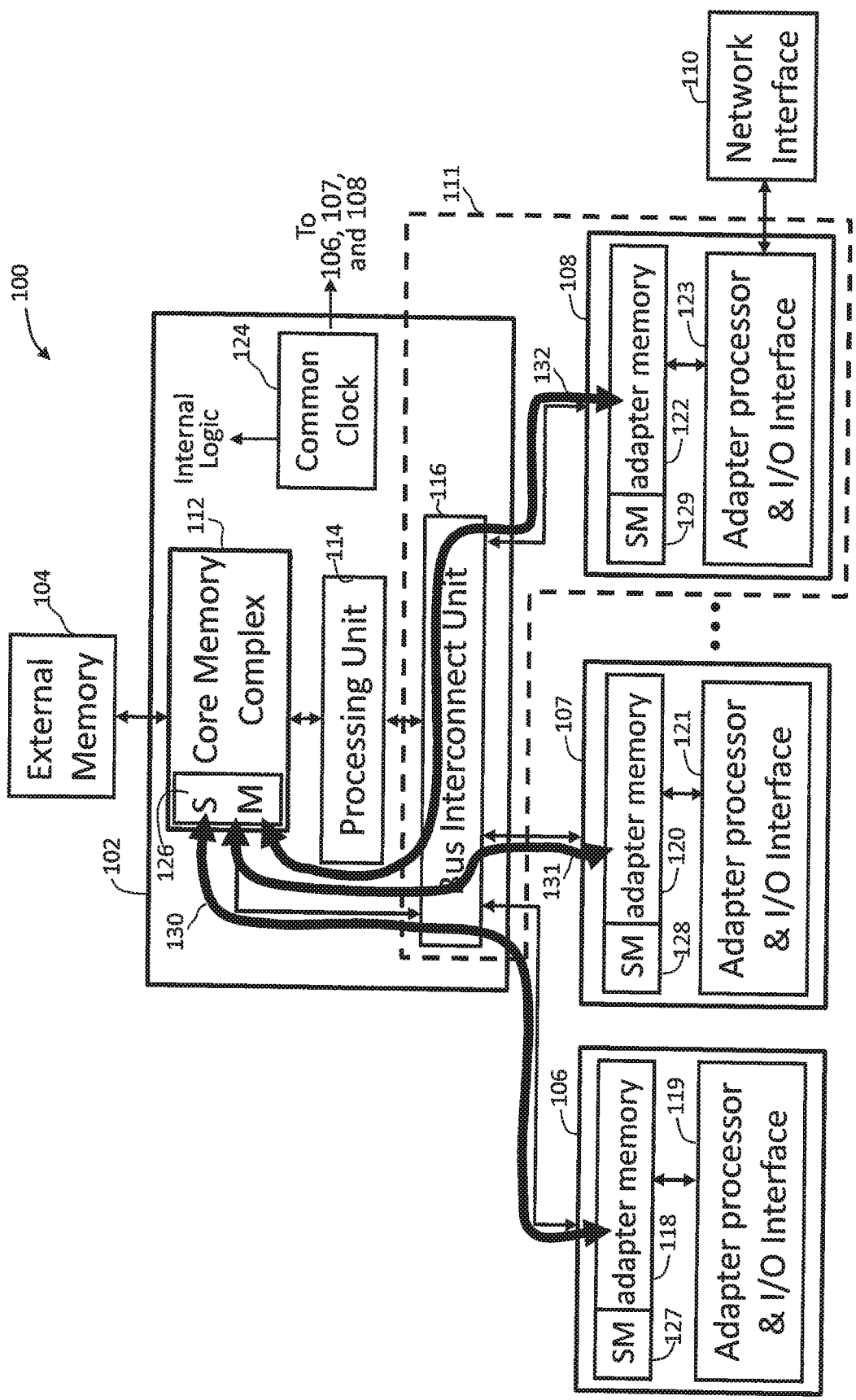
FIG. 1 illustrates a processing complex using synchronous shared memory for internal control of network adapters and various peripherals.

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer-readable storage medium having non-transitory computer-usable program code embodied in the medium. Any suitable computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. A program written in one of these languages is compiled to a target processor architecture operating on a node by converting the high level program code into a native assembler program. Programs for the target processor architecture may also be written directly in a native assembler language. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module, or in a combination of the two. A software module storing non-transitory signals executed by a processor may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. The storage medium coupling to the processor may be a direct coupling integral to a circuit implementation or may utilize one or more interfaces, supporting direct accesses or data streaming using downloading techniques. In the alternative, the storage medium may be integral to the processor.

The present invention is directed towards providing a flow-based, reliable, high-bandwidth network comprised of multiple paths between sites. A node or node processor complex is an independent processing entity, which is for example, a sub-system of a network embodiment that includes a CPU, a memory sub-system, an operating system, and a persistent storage media such as a hard disk. The network embodiment includes a high performance interconnect structure having means through which the nodes or independent processing entities communicate state and synchronization information for the purpose of executing distributed applications. A distributed application is an application that operates across multiple independent processor entities. The distributed application may be highly responsive or may be batch oriented with variations in between. For example, a highly responsive distributed application is generally required to respond to requests for services within a sub second response time with a very high probability of meeting the requirements. In contrast, a batch distributed application is generally required to respond to requests for services that are not time-limited which allows responses to be non-deterministic with responses that may vary from seconds to, for example, 30 hours or longer.

The time responsiveness of distributed applications is limited by the ability of the interconnect to provide communications between the independent processor entities the application is distributed across. For example, if the requirement for the distributed application is to be highly responsive, the underlying interconnect is required to deterministically be of very low loss, low latency, high bandwidth, low congestion, and low jitter. Stated differently, for the services of the distributed application to be timely, the underlying interconnect must have a narrow range between best case and typical case that tends to converge to the best case for delivery of state information between processing entities and the applications contained within them. Generally, if the required service level is not provided by the underlying interconnect, the distributed application will not be able to provide its users the required level of responsiveness for proper and correct results of the application.

There are many different types of interconnects that may be used for distributed applications. One example is the use of a high speed bus within a multi-core central processing system. Another example is the use of the public Internet with applications distributed across diverse geographies and processors types.

For a highly responsive distributed application, the typical accommodation has been to collect all independent processor entities at the same geographic location and interconnect the independent processor entities with high performance and high capacity connections. Examples are processor farms and super computer clusters that use very high speed networks or backplane buses and switches to accommodate the need for multi process memory sharing and synchronization. A famous example is the computer system Deep Blue that combined 30 independent processing entities with a high performance interconnection containing a high speed and low latency crossbar fabric for the purpose of playing a game of chess using a distributed application. The interconnect used, because it possessed a highly deterministic quality, provided the ability for the distributed application to make complex decisions in short periods of time as was required for its application in chess matches.

An interconnect or network is generally not able to be of high deterministic quality and distributed applications operating within a standard type network are generally not able to be highly responsive. A network typically not used as an interconnect for highly responsive distributed applications is the public Internet, because it lacks the perquisite properties of deterministic high bandwidth and high quality. If the Deep Blue distributed application attempted to utilize the public Internet as the interconnect between its independent processing nodes, the application would not have been able to provide the timeliness required for its analysis routines and would not have been as successful as a result. Typically, the public Internet may be used as an interconnect for distributed applications as long as the distributed applications are not required to be highly responsive. Also, a single public Internet connection does not provide for high quality and highly responsive networks for extended periods. A distributed application that requires fast response times may become unreliable and prone to inconsistent timing behaviors during the duration of its run. The predictability of an interconnect, such as the Internet, generally decreases more when the geographies are diverse. Even though the public Internet generally provides the ability to connect any computer to any other computer, by design, it does not discriminate if the computer is in Bangalore, India or New York, N.Y., USA. The performance of the public Internet, may also be highly inconsistent between these geographies and at different times of day depending on the general use of the public Internet and congestion at particular times within a geographic location and within a service provider network.

There are distributed applications that do not require high responsiveness that currently use the public Internet to provide processing interconnects. These distributed applications are typically batch oriented and have very limited need for sub-second synchronization. These applications typically submit a "job" to an independent processor across the network, and then some time later, typically minutes or hours, the job completes and replies with the results. A famous example of batch type distributed application is the SETI@home screen saver application that uses thousands of volunteer's computers during their idle times to process batch jobs to analyze radio signals from outer space. Each local job takes about 30 hours of time to complete.

An evaluation of the spectrum of distributed applications underlying an interconnection's ability to provide deterministic services from highly responsive to the batch oriented services shows that a strong correlation can be found between an application's responsiveness and its underlying processing interconnection's ability to manage latency, bandwidth, congestion, jitter and loss. Thus, distributed applications have generally been designed and constrained by the capabilities of underlying processing interconnects, including the ability of each of the nodes to satisfy each application's requirements. As a consequence, if a highly predictable interconnect is not available, a distributed application will not be highly responsive.

As illustrated herein, a means of providing highly predictable quality interconnections for use with highly responsive distributed applications is described using the less than predicable networks, such as the Internet, private wide area networks, or networks within an enterprise. The method does this by advantageously adapting the capabilities of adaptive private networking technology. U.S. patent application Ser. No. 12/482,766 entitled "Flow-Based Adaptive Private Network With Multiple WAN-Paths", filed on Jun. 11, 2009 which claims the benefit of 61/060,846 filed Jun. 12, 2008 are both hereby incorporated by reference in their entirety. As adopted herein, this technology permits multiple independent networks of potentially differing qualities to be combined to provide a typical service level that is better than any one of the component networks could provide if it was used solely.

The technology and methods described herein may be applied to any network interconnect that may have times of relative unpredictability. Examples of non-Internet and non-wide area network applications include utilization of various wireless networks interconnected at an enterprise premise, infrared communications, local area networks, and networks for use in military applications, such as on a naval ship where interconnects between systems generally have high amounts of redundancies and resiliencies in case damage to differing parts of the ship is sustained.

The adaptive private network (APN) contains two or more nodes that are located at points of entry to wide area networks (WANs) and at points of exits from wide area networks. We refer to the point of entry to the wide area network as WAN ingress. We refer to the point of exit from the wide area networks as WAN egress. Access to wide area networks is provided by a network service provider. The APN nodes may have multiple wide area network access points. We refer to WAN access points generally as WAN links. It is preferred and optimal if each of the wide area access points is provided by different service providers so as to provide for higher redundancy and eliminate single points of failure. Wan links may access the public internet, such us the use of broadband cable lines, digital subscriber lines or other. Other WAN links may provide private wide area networks such as multi-protocol label switching networks (MPLS), point to point leased circuit networks or others. The APN establishes multiple paths between the WAN ingress WAN links and WAN egress WAN links across the network. The term path generally is used to refer to a unidirectional connection between a WAN ingress WAN link and a WAN egress WAN link. The term conduit is used to refer to the connection between an APN node at one location and an APN node at another location which are connected via multiple paths.

Each node in an adaptive private network is configured to operate with a highly calibrated shared reference clock. Within the APN, there exist one or more APN nodes that serve as the reference clock source. These nodes are referred to as network control points (NCPs). Within the network there are one or more APN nodes that serve as clients nodes and acquire their reference clock from NCP nodes. These nodes are referred to as client nodes. The APN network clock calibration is performed by a clock request message that contains the local clock time at the client node and a serial number that is sent from an APN client node to the NCP node via duplicate transmission across paths that are as independent as possible from each other. The NCP nodes reply to the first clock request message received. The NCP nodes discard any other clock request messages received that contains any serial number from a previously processed request from the APN client node. This provides for the processing of the clock request messages only on the lowest actual latency path. The NCP's clock request reply message contains within it a current time according to the clock of the NCP as well as a serial number. The reply message is sent from the NCP node to the APN client node via duplicate transmission across paths that are as independent as possible from each other if any. The APN client accepts for processing the first clock request reply message received for a particular serial number. This provides for the processing of the clock request reply messages on the lowest actual latency path. By reducing the round trip latency for the clock requests and replies, the APN maintains a calibrated clock with lower phase shift error than would be possible if only one path between client and NCP were used.

The reference clock is used to calculate the duration of time each packet takes as it crosses a wide area network. The duration of packets are used to determine statistical behavior models for latency and jitter of the network which are shared between the WAN egress nodes and the WAN ingress nodes via conduit quality reports. The use of the conduit quality reports are discussed below.

APN memory services utilize the underlying APN services to a high degree. It is the use of these services that supports the APN memory services to be unique in its capabilities for being able to provide services for highly responsive distributed applications across different networking techniques.

With the APN memory services use of the APN services, an APN memory refresh may be transmitted using duplicate transmissions. When the APN transmits data across multiple paths, the paths are chosen to be of low latency, low loss, and low jitter and to be from different WAN service providers at the WAN ingress point and the WAN egress point if possible. If this is not possible the APN services attempts to determine unique service providers at the WAN egress access points. If this is not possible, the APN services will attempt to determine unique service provides at the WAN ingress access points. By transmitting the APN memory refresh across different high quality paths, in terms of low loss, low latency, and low jitter, that are provided by different service providers when available, the APN memory refresh is able to be delivered at lower typical latency, loss, jitter and higher availability than would be possible if only one path was used. The cost of utilizing these services is consumption of additional bandwidth for the redundant transmissions.

With the APN memory services use of the APN services, an APN memory refresh may be transmitted using the APN reliable services. When the APN transmits data across a path, the WAN egress nodes checks for packet loss via per packet sequence order accounting. The WAN egress node also checks for dead or quite paths with its nag protocol, which may be an indication for potential loss. Further details of loss detection and nag protocol may be found in U.S. patent application Ser. No. 12/482,766 filed Jun. 11, 2009 entitled "Flow-based Adaptive Private Network with Multiple WAN-Paths", for example in FIG. 1H and at page 38, line 15 to page 42, line 13. If the WAN egress node detects that a packet loss occurred or a packet loss may have occurred, the WAN egress node immediately communicates the loss indication to the WAN ingress node via a packet that is sent via duplicate transmission across paths that are as independent as possible from each other and transmitted using the APN reliable service in the opposite direction. The result is the loss indication itself is sent with high redundancy for reduced probable latency, jitter and loss. If the packet containing the loss indication itself is lost, the loss indication packet is retransmitted as noted below. The WAN ingress node, upon reception of the loss indication, retransmits the data on the current best available path for low latency, low loss, and low jitter. This retransmission may not, and typically is not, the same path the packet was originally transmitted across when the original loss occurred. The consequence of the retransmission may be that the APN memory refresh is jittered as compared to the APN refresh if no loss had occurred. The benefit of utilization of multiple available paths for the retransmission is that the APN memory refresh arrives with much greater reliability and lower probably of jitter than if the packet had not been retransmitted or if the packet had been only retransmitted using the same path where the original loss occurred.

For example, with two APN nodes and two paths contained within the conduit. One path, Path A, has a sustained 1% packet loss and 100 millisecond latency. The other path, path B, has no packet loss and 100 millisecond latency. Assuming that a loss indication from the WAN egress APN node takes 100 milliseconds to be transmitted, if the path A is used to transmit a APN memory refresh, one APN memory refresh out of a hundred would be lost. For packets that have a successful retransmission on the first attempt, then one packet in one hundred would have 100 millisecond additional time for the retransmission plus the 100 milliseconds of time for the loss indication resulting in a total jitter of 200 ms. If the retransmit of the memory refresh is constrained to use Path A, then the retransmit packet has one in a hundred chance of also being lost. If the second attempt was successful, then the total jitter may be 400 milliseconds of jitter. For a network of 1% loss, this happens once for every 10,000 packets which is considered to be frequent. Additionally, if the third retransmission is lost, then the jitter could be 600 milliseconds or more. Because the APN retransmission that utilize alternative paths, such as the pristine Path B above, the jitter has a substantially higher probability to be contained closer to the ideal 200 ms than would be possible if only one path was available.

With the APN memory services use of the APN services, an APN memory refresh may be transmitted using the APN reliable services and using duplicate transmissions. The cost of this very high quality service is use of additional bandwidth and the potential for, under high packet loss, some additional jitter. The benefit is the probability of loss and jitter is very low. The potential of lower latency and availability of the WAN service is very high.

With the APN memory services use of the APN services, an APN memory refresh may be transmitted using the APN load balancing services. The APN utilizes the quality reports from the WAN egress node and the currently queued packets awaiting transmission within the WAN ingress APN node to do latency sensitive load balance. If the APN distributed memory is of large size, transmitting the memory refresh generally may require fragmentation. If the APN memory services were to transmit the refresh using only one path across the wide area network, then the APN memory refresh would have a serialization delay and maximum transmit rate relative to the size of the distributed memory plus additional protocol overhead at the WAN ingress WAN link and at the WAN egress WAN link for the path. By utilizing the APN services, the memory region fragments may be distributed in a time sensitive way optimized for simultaneous arrival times at WAN egress utilizing multiple paths and multiple WAN links. The cost is, because of the nature of the load balancing algorithm, some additional latency may be added. The benefit is that the overall serialization delay and transmission size is spread across multiple WAN links reducing the overall time across the network.

In brief, adaptive private network services utilize multiple independent diverse networks, dynamic real time packet processing, universal sampling and analysis among its many aspects to increase the probability of having timely deterministic responses, aspects of a high quality highly responsive network, to be available to users of the adaptive private network services.

FIG. 1 illustrates a processing complex 100 using synchronous shared memory for internal control of network adapters and various peripherals. The processing complex 100 includes a core processor unit 102, an external memory 104, and various peripheral adapter units 106 and 107 and a network adapter unit 108 with a network interface 110. The core processor unit 102 has a core memory complex 112, having one or more levels of caching, a processing unit 114, having one or more processors, and a bus interconnect unit 116 for connecting to one or more adapter units. The peripheral adapter units 106 and 107 and the network adapter unit 108 have an adapter memory 118, 120, and 122, respectively, as well as an adapter processor and input/output (I/O) interface logic 119, 121, and 123, respectively. The adapter processors and I/O interface logic 119, 121, and 123 may be implemented with an internal processor and memory subsystem. Such adapter processors and I/O interface logic 119, 121, and 123 and the processing unit 114 are responsive computer readable media either downloaded or instantiated within the associated unit. Also, as described in more detail below, an I/O unit 111 comprises an adapter, such as network adapter unit 108 and an associated portion of bus interconnect unit 116.

The processor complex 100 also operates with a common clock 124 or with clocks derived from the common clock 124 such that operations on and between the core processor unit 102, the external memory 104, and the various peripheral adapters 106 and 107 and the network adapter 108 are synchronous, have very high performance, and high reliability. Such a processor complex 100 may instantiate control operations and data transfers through the use of shared memory operations between the core processor unit 102 and each of the peripheral adapters 106 and 107 and the network adapter 108. For example, the core memory complex 112 may share a block of memory locations 126 using communication paths 130-132 with a corresponding block of shared memory locations (SM) 127-129. Due to the high performance and high reliability of operations with the processor complex 100, updates to shared memory are synchronous within the time frame of multi-mega-hertz and giga-hertz clocks. A distributed shared memory organization facilitates programming of control operations and data transfers and usually has low overhead due to the synchronous nature of the local communications. Extending a shared memory architecture across a network is considered a very difficult problem due to the unreliability of most network connections and the long latency of communication between nodes in the network.

Figure 2A:
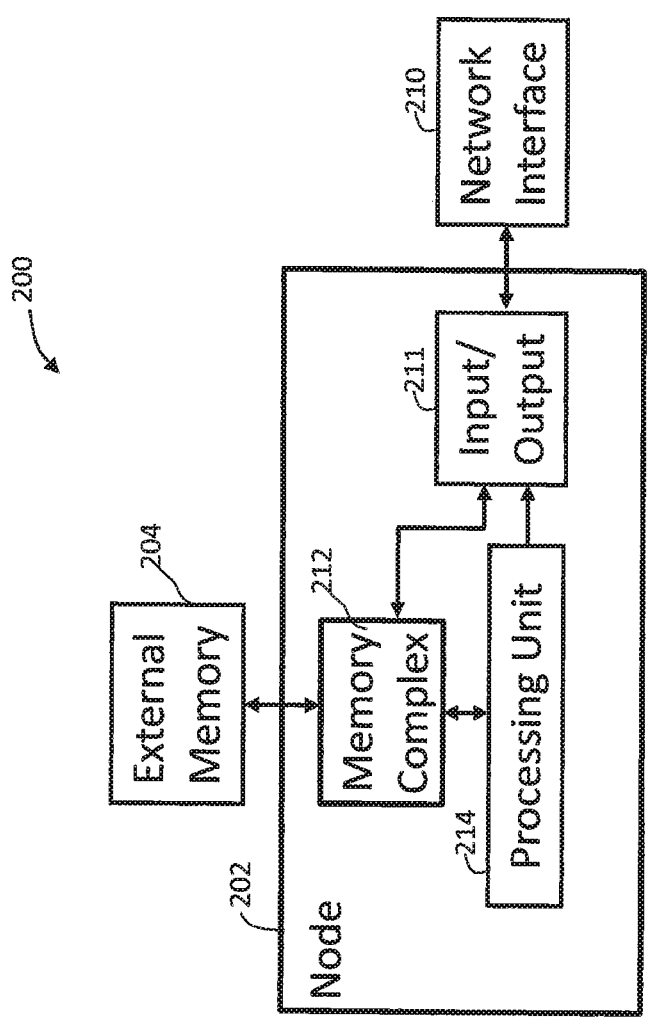
FIG. 2A illustrates a node processor complex suitable for use as a sender node or as a receiver node in an adaptive private network (APN) in accordance with the present invention.

FIG. 2A illustrates a node processor complex 200 suitable for use as a sender node or as a receiver node in an adaptive private network (APN) in accordance with the present invention. The node processor complex 200 includes a processing unit 214, a memory complex 212 containing program memory and data memory, external memory 204, input/output functions 211 using a transport reliable protocol (TRP), and network interface 210. The methods described in connection with the embodiments disclosed herein may be embodied directly in one or more software modules executed by a processor and memory complex such as the node processor complex 200, a personal computer, a server, or the like having one or more central processing unit devices. The processor node complex 200, for example, may be configured to execute instructions under control of a software program stored on a computer readable storage medium either directly associated locally with the processor and memory complex, such as may be available through an instruction cache, or accessible through an I/O device.

Figure 2B:
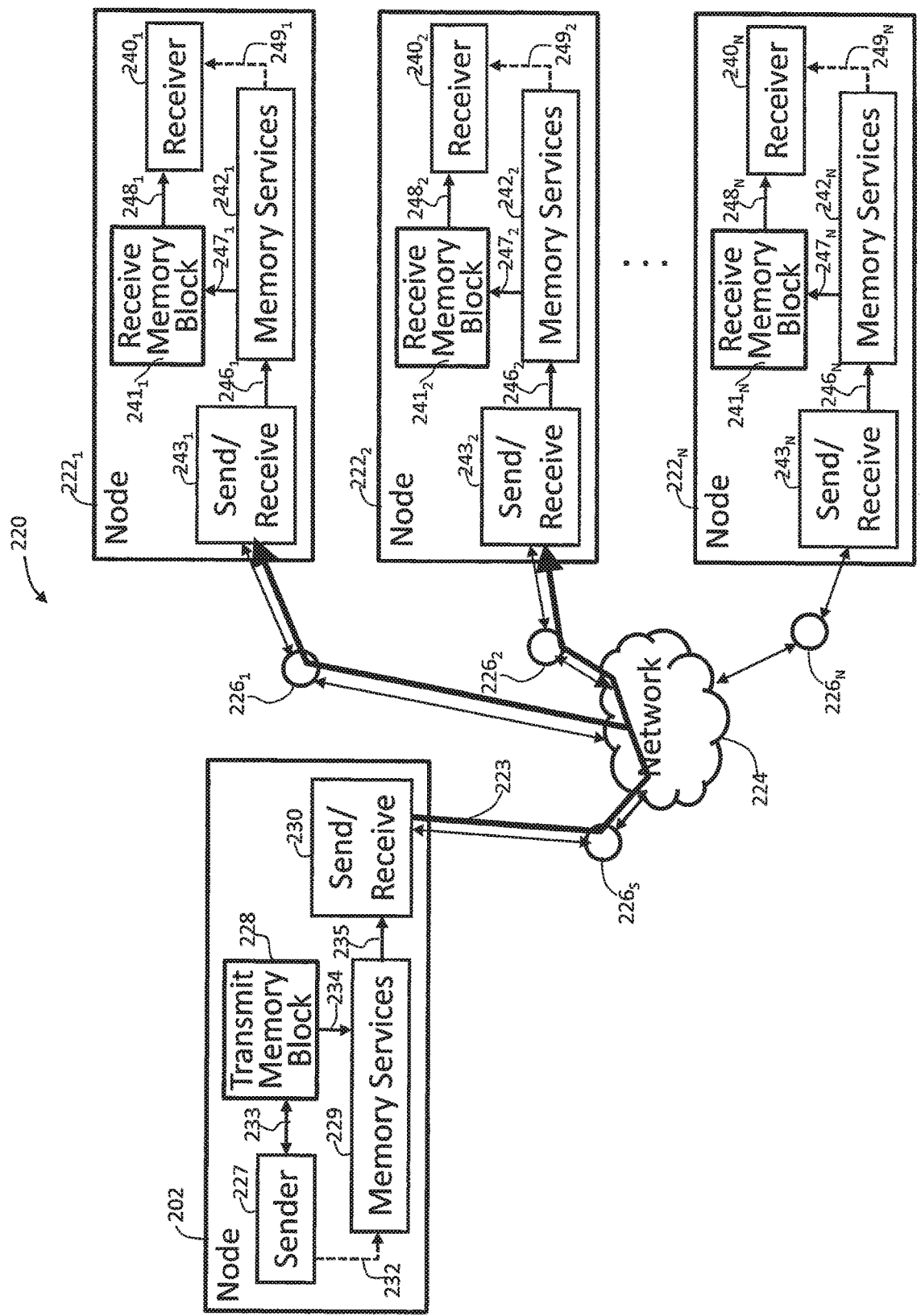
FIG. 2B illustrates a network configuration having a sender node and a plurality of receiver nodes in accordance with the present invention.

FIG. 2B illustrates a network configuration 220 having a sender node 202 and a plurality of receiver nodes $222_1$, $222_2$, ..., $222_N$ in accordance with the present invention. The network configuration 220 also includes a network 224 and routers $226_S$, $226_1$, $226_2$, ..., $226_N$ for interconnecting the sender node 202 and the plurality of receiver nodes $222_1$, $222_2$, ..., $222_N$. The network 224 and routers $226_S$, $226_1$, $226_2$, ..., $226_N$ collectively represent an adaptive private network (APN) which may operate across the network 224, such as the Internet. An adaptive private network (APN) may include wide area networks (WANs), adaptive private network appliances (APN appliances, or APNAs) in the network nodes, network application services, as well as APN conduits between APN appliances. A WAN link represents a physical access point to the wide area network (WAN), such as a digital subscriber line (DSL) connection or a cable modem. One of the distinctive characteristics of a WAN link is bandwidth, representing the amount of data capacity available for transmission and reception. WAN links may be shared among APN conduits, and intranet and Internet network services. In the present embodiments, APN appliances do not directly attach to WAN links. APN appliances communicate with WAN links through logical connections, such as provided by intermediate routers $226_i$ of FIG. 2B.

The sender node 202 includes a transmitting application 227, an adaptive private network (APN) distributed transmit memory block 228, a memory services block 229, and a send/receive block 230 using a transport reliable protocol (TRP). Each receiver node "i" includes a receiving application $240_i$, a receive memory block $241_i$, a memory services function $242_i$, and a send/receive function $243_i$. Contents of selected locations in the transmit memory block 228 may be shared and synchronized with memory blocks in one or more of the receiver nodes $222_1, 222_2, \ldots, 222_N$ so that the remote receiver nodes have access to the same data within a programmed update period or on an as needed basis for more critical applications.

FIG. 2B illustrates the sender node 202 sharing a data set of a specific type with receiver nodes $222_1$ and $222_2$. The memory services block 229 is responsible for synchronizing the data set in the transmit memory block 228 of sender node 202 with corresponding data sets in receive memory blocks $241_1$ and $241_2$ of receiver nodes $222_1$ and $222_2$, respectively. The transmitting application 227 may write data to or read data from the transmit memory block 228 over a memory interface 233. The receiving application $240_i$ may only read from the receive memory blocks $241_i$ over a memory interface $248_i$. In order to insure the transmitting application 227 and receiving applications $240_1, 240_2, \ldots, 240_N$, maintain consistent data during a synchronizing transmission, the data set being transferred is locked at each node during the sending and receiving operations, as described in more detail below.

For example, memory updates in the receiver nodes $222_1$ and $222_2$ can occur either as a result of an explicit update request received from the sender node, as shown in data path 223 shown in bold in FIG. 2B, or on a periodic interval defined when services for a memory type are initialized, or both. Whenever an update to a memory block is received in a receiver node "i", an up-call 249, is called by the memory services function $242_i$ to notify the receiving application $240_i$ that an update has been received, and to perform whatever function is necessary. Data transmitted is loaded into the receive memory block $241_i$ across a memory interface $247_i$. Also, the memory services function $242_i$ supports functions, such as, user defined compress and decompress functions to compress or uncompress data sets for more efficient reception and transmission across the network. The compress/decompress functions may also be used to update a data set in a memory block before sending or to construct a message to be sent, as described in more detail below. The memory type is a value that is unique among communicating systems. The sender application and receiver applications are coordinated to agree on the structure of a data set for a specified memory type.

Figure 3:
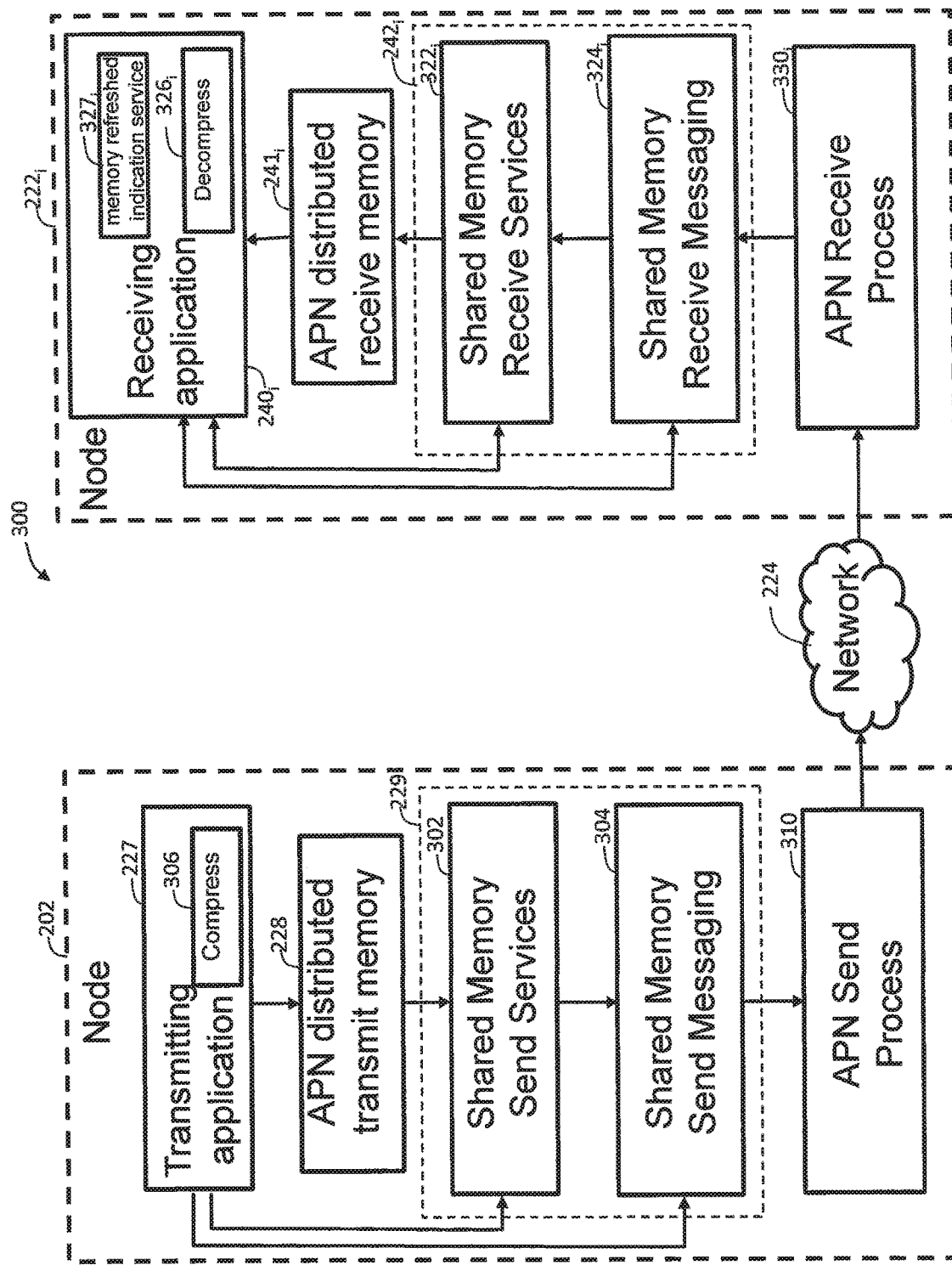
FIG. 3 illustrates software communication layers in a sender node and a receiver node using shared distributed memory in accordance with the present invention.

FIG. 3 illustrates software communication layers in a sender node 202 and a receiver node 222i using shared distributed memory in accordance with the present invention. The sender node 202 includes the transmitting application 227, the transmit memory block 228, the memory services block 229, and an APN send process 310, such as a transport reliable protocol (TRP), of send/receive block 230. The transmitting application 227 includes a compress function 306. The memory services block 229 includes a shared memory send services block 302 and a shared memory send messaging block 304. The receiver node $222_i$ includes the receiving application $240_i$, the receive memory block $241_i$, the memory services function $242_i$, and an APN receive process $330_i$, such as a transport reliable protocol (TRP), of send/receive function $243_i$. The receiving application $240_i$ includes a decompress function $326_i$ and a memory refreshed indication service routine $327_i$. The memory services function $242_i$ includes a shared memory receive services block $322_i$ and a shared memory receive messaging block $324_i$.

On the sending side, the transmitting application 227 may be responsible for identifying destination nodes, identifying data sets to synchronize between nodes at a specified update period, setting of control block data, locking and unlocking data sets when doing an update process, requesting updates to be sent if necessary, and compressing shared memory data sets for message transmission. The shared memory send services block 302 is responsible for locking and unlocking data sets when transmitting, updating communication timeliness, update rate throttling to keep within a max number of updates within a specified time period, and setting of a memory update version for tracking and indication. The shared memory send messaging block 304 is responsible for node-to-node messaging, data integrity checking, addresses, point-to-point transmission, point-to-multi-point transmission, fragmentation of large data sets prior to transmission, and update version checking.

Figure 4A:
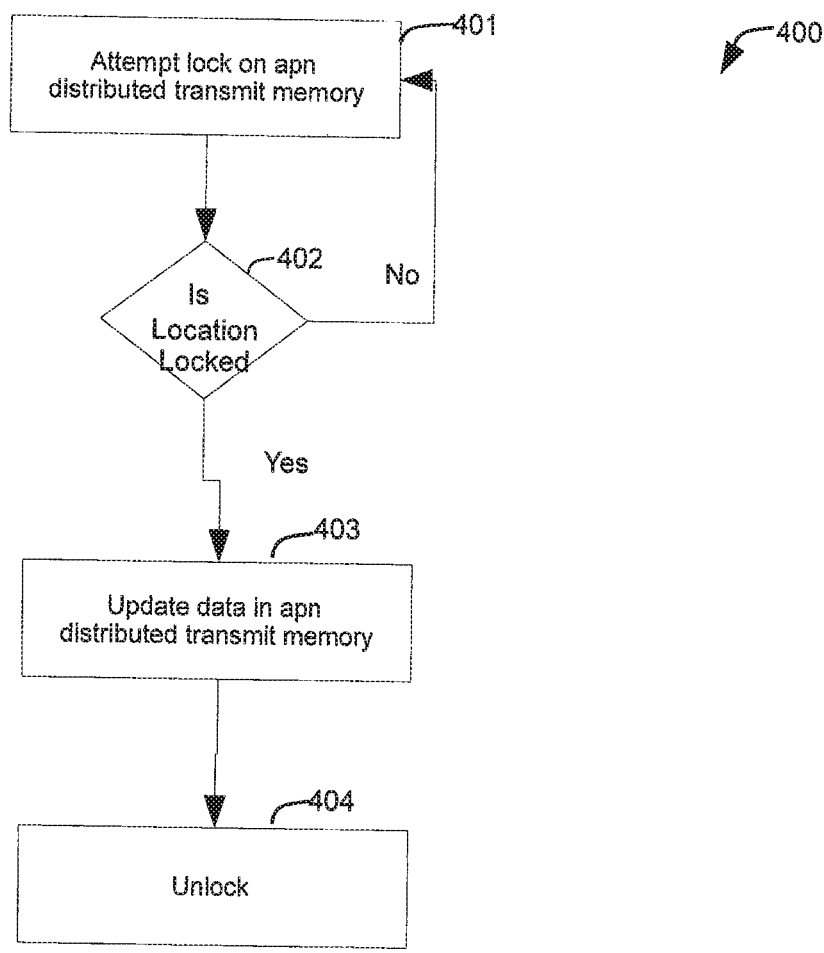
FIGS. 4A-4D illustrate a shared memory block sending process in operation at a sending node in accordance with the present invention.
Figure 4B:
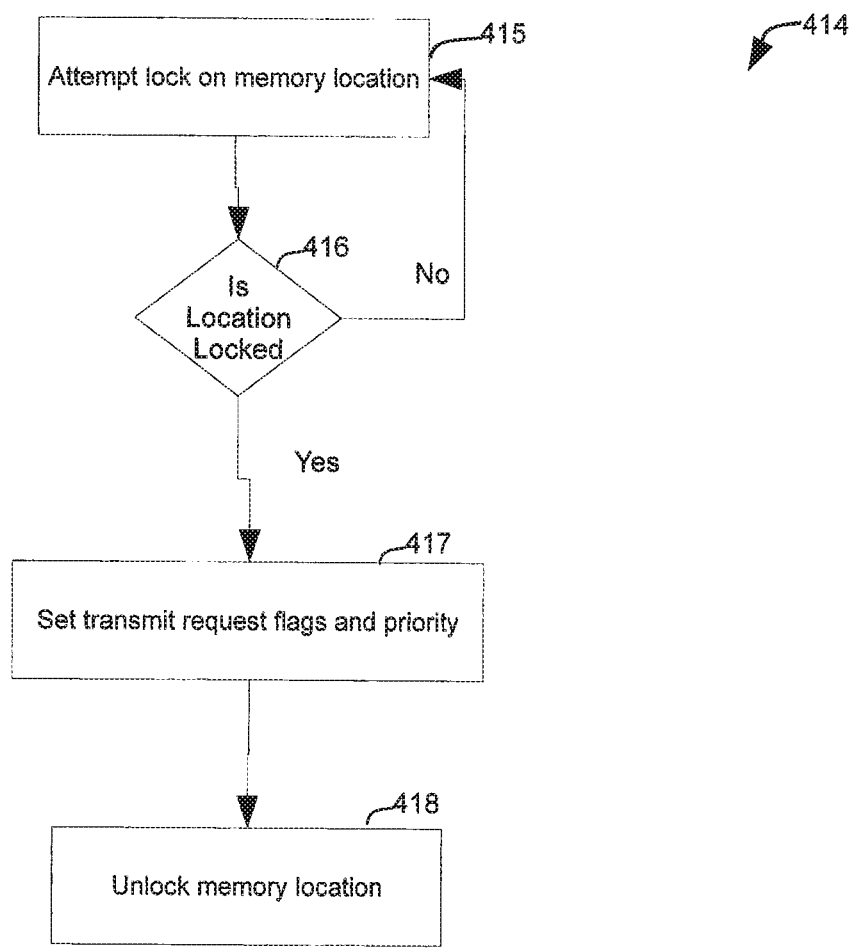

On the receiving side, the receiving application $240_i$ is responsible for decompressing shared memory data sets on message reception, reading of control block data as necessary, locking and unlocking data sets when reading data from the receive memory block $241_i$, and reacting to updates as necessary. The shared memory receive services block $322_i$ is responsible for locking and unlocking data when receiving data from the network 224, history logging, and placing an update up-call to the receiving application $240_i$. The shared memory receive messaging block $324_i$ is responsible for node-to-node messaging, data integrity checking, addresses, point-to-point reception, point-to-multi-point reception, defragmentation of fragmented large data sets received during transmission, and update version checking. FIGS. 4A-4D illustrates a shared memory block APN send process 400 in operation at a sending node in accordance with the present invention. FIGS. 5A and 5B illustrates a shared memory block APN receive process 500 in operation at a receiver node in accordance with the present invention.

The APN memory communicates between distributed components of distributed applications through APN-distributed memory regions. An APN memory region is updated on the transmitting APN node, with the update reflected via this instrument to one or more subscribing receiving nodes.

The use of the underlying APN network services are a significant factor in the operation of the APN distributed memory. Blocks 310 and 320 of FIG. 3 are elements of the APN service that is utilized by the APN distributed memory. The APN service provides for communication of data via the APN conduit services. In addition, the APN service provides for high transmit priority of APN distributed memory data versus other traffic via the quality of service (QoS) super critical priority schedulers and shadows for WAN links. In addition the APN service provides for higher throughput of APN distributed memory data transmission via bandwidth allocation to higher quality paths avoiding lower quality paths. In addition, the APN service provides for delivery reliability for APN distributed memory data via fast retransmissions on single packet loss detection. In addition, the APN service provides for reliability and timely delivery of APN distributed memory data through redundancy transmissions via duplicate transmissions on high best path and most independent path from best path.

A best available path process searches for an ideal set of paths having unique ISP identifications on the remote and local WAN Links. A measure of independence of paths is determined such that one path may be selected having a greater measured level of independence than other available communication paths. If an ideal set of paths is not found, the best available path algorithm searches for a set of paths having unique ISP identifications on the remote WAN links and otherwise unique local WAN links. Third, the best available path process searches for paths with otherwise unique remote and local WAN links. Fourth, the best available path process searches for paths with a single local WAN link and otherwise unique remote WAN links. Should none of these sets of paths be found, the best available path process settles for one path sharing a single pair of WAN links, which means the packets to be duplicated are simply transmitted on a single path twice. Once the best available path or paths are determined, a packet buffer is allocated and the packet is copied. Both packets are forwarded to a WAN link scheduler where the packets are scheduled on their respective WAN links.

The APN service also provides secure transmission of APN distributed memory data using AES encryption. In addition, the APN service provides low latency of APN distributed memory data transmission via a high resolution clock calibrated for use for high frequency path monitoring resulting in high latency path avoidance. Further details of the high resolution clock may be found in U.S. patent application Ser. No. 12/482,766 filed Jun. 11, 2009 entitled "Flow-based Adaptive Private Network with Multiple WAN-Paths", for example in FIGS. 1H, 1I, 2, and 7 and at page 9, line 20 to page 18, line 17 and page 32, line 9 to page 34, line 9. In addition, the APN service provides for low packet loss of APN distributed memory data via packet loss monitoring and loss prone path avoidance. In addition, the APN service provides for low jitter of APN distributed memory data via path jitter monitoring and high jitter path avoidance. In addition, the APN service provides for congestion avoidance of APN distributed memory data via high resolution clock synchronized enabled congestion monitoring and avoidance. The APN distributed memory service, as shown in block 229 and 242 of FIG. 3, provides services to the transmitting and receiving applications as shown in blocks 227 and $240_i$, respectively. The APN distributed memory service provides for refresh of APN receive memory block $241_i$ with data from the transmit memory block 228 of FIG. 3. A refresh operation is a transaction for updating a receive memory and includes transmitting a block of memory having one to a plurality of data values to one or more receive memories in receiving nodes. Depending on the size of a block of memory, the refresh operation may also include fragmentation into a plurality of data packets. A refresh operation may also be specified to use reliable transmission. In addition, the APN distributed memory service provides for transmissions update priority as indicated via the transmitting application 227. In addition, the APN distributed memory service provides for update priority as indicated by the transmitting application 227. In addition, the APN distributed memory service provides for fragmentation of transmit memory block 228 on transmit side block 229 of FIG. 3 and reassembly of APN receive memory block $241_i$ on the receive side memory services function 242. In addition, the APN distributed memory service provides for setting of refresh versions of transmit memory block 228 and version checking prior to accepting the refresh data and writing APN receive memory block $241_i$. The version checking prevents out of order older refresh data from overwriting data that is more recent. In addition, the APN distributed memory service provides for the distributed application defined compression function 306 and decompression function 326, for distributed memory. In addition, the APN distributed memory service provides for the locking and unlocking distributed memory to assure full coherency of an APN distributed memory refresh contents of the transmit memory block 228 prior to transmit. The locking and unlocking of distributed memory is utilized to assure full coherency of an APN distributed memory refresh contents of the receive memory block $241_i$ to prevent a refresh from altering the receive memory block $241_i$ when in use by the receiving application block $240_i$. In addition, the APN distributed memory service provides for maximum threshold of distributed memory refreshes to be transmitted per second via means that is not a linear time rate schedule within the period of the second. In addition, the APN distributed memory service provides for maximum time duration permitted without a refresh transmit from the transmit memory block 228 of FIG. 3 and the receive memory block $241_i$.

At time of initialization, the distributed applications on the transmitting and receiving nodes, 202 and $222_i$ of FIG. 3 respectively, are expected to configure properties of the APN memory service for communication prior to utilizing the communication services.

The transmitting application 227 allocates blocks of memory, such as the transmit memory block 228, that will be used for its distributed transmit memory. The transmitting application 227 registers distributed transmit memory to APN memory service 229 and is provided with a reference to an APN memory service control block. The transmitting application 227 specifies desired properties of the APN distributed memory service when invoking the registration routine. The transmitting application 227 may specify that a refresh should be scheduled with high priority above other contending traffic using the conduit. The transmitting application 227 may specify that refresh should be duplicated using independent diverse paths within the conduit. The transmitting application 227 may also specify that the APN services should retransmit a refresh packet if it is lost as it crosses the network. The transmitting application 227 may also specify that the APN services should be duplicated using independent diverse paths within the conduit. For example, the application may select duplication of transmission or single transmissions. The application may also select reliable retransmissions or no retransmissions when packet loss occurs. The application may also select super critical transmission with shadow scheduling or real time scheduling.

The transmitting application 227 then registers the remote APN node sites that will be subscribed to the transmissions of the distributed memory refreshes. Each remote APN node site must have an APN conduit configured to connect the node with a transmitting application to a node with a receiving application. The configured conduit will provide security, connectivity, path monitoring priorities, bandwidth and the like as defined in U.S. patent application Ser. No. 12/482,766.

As shown in FIG. 3, at time of initialization, the transmitting application 227 allocates a block of memory, such as the transmit memory block 228, that will be used for the distributed transmit memory. The transmitting application 227 registers distributed transmit memory to the APN memory service 229 and is provided with a reference to an APN memory transmit service control block. The transmitting application 227 associates additional properties to the APN memory services which are stored in the APN transmit service control block. A memory identifier property is specified which provides a unique identifier for the APN memory element that will be used by the transmission and receiving nodes to identify the distributed memory binding. The memory identifier is common between the receiving application $240_i$ and the transmitting application 227. The memory identifier is either well known prior to initialization or is communicated between the transmitting and receiving application via other means.

A memory size property is specified which indicates the size of the both the distributed transmit and receive memory blocks 228 and $241_i$, respectively. This size is common between the receiving application $240_i$ and the transmitting application 227. The size is either well known prior to initialization or is communicated between the transmitting and receiving applications via other means. A maximum refreshes per second threshold property is specified which indicates the maximum number of times memory refresh will be permitted per second. A maximum duration permitted without a refresh property is specified which indicates the longest period of time permitted between memory refreshes. A compression service routine property may be specified that references a compress function 306 that is invoked prior to any transmission of the distributed memory for compression of the contents to a potentially smaller size for transmission. If no compression service routine is specified, the APN memory service transmits the APN memory unmodified. One suitable means of compression is very highly correlated to the application type and the data that may be contained in the memory. A general purpose application may not be optimal in all cases, where an application defined service routine is able to utilize greater optimization assumptions that are specific to the application. For example, video compression may provide means of compressing key frames occasionally, and providing delta updates between refreshes, whereas text data may use simple Lempel-Ziv-Welch compression methods.

As shown in FIG. 3, the receiving application $240_i$ allocates a block of memory that will be used for its distributed receive memory block $241_i$. The receiving application $240_i$ registers the distributed receive memory to the APN memory service function $242_i$ and is provided with a reference to the APN shared memory receive services block $322_i$. The receiving application $240_i$ associates additional properties to the APN memory services which are stored in the APN receive service control block. A memory identifier property is specified which provides a unique identifier for the APN memory element that will be used by the transmission and receiving nodes to identify the distributed memory binding. The memory identifier is common between the receiving application and the sending application. The memory identifier is either well known prior to initialization or is communicated between the transmitting and receiving applications via other means. A memory size property is specified which indicates the size of both the distributed transmit and receive memories. This size is common between the receiving application and the sending application. The size is either well known prior to initialization or is communicated between the transmitting and receiving applications via other means. A set of remote APN node sites identifiers are specified to identify nodes that are permitted to transmit to the specified distributed receive memory.

A decompression function $326_i$ may be invoked upon reception of a memory refresh for its decompression. If specified, the receiving application's decompression function is configured to be compatible with the transmitting application's compression function. If specified, the decompression function $326_i$ is invoked prior to invoking any specified memory refreshed service indication routine. A memory refreshed indication service routine $327_i$ may be invoked whenever the distributed receive memory is updated by the APN memory service. The APN distributed memory is configured to be unidirectional in operation. The APN distributed transmit memory block 228 is written by the transmitting application. The APN distributed receive memory block $241_i$ is read by the receiving application. If a distributed application requires bidirectional communication, then two unidirectional distributed memories pairs may be used, one memory region for communication in one direction, the other memory region for communication in the other direction.

A local locking facility is used at the sender node 202 and the receiver node $222_i$ for both the APN distributed memories to preserve an atomic snapshot of a memory refresh in order to prevent incomplete updates. The locks are done via a locking mechanism in hardware or via a software operating system variation such as a variation of a pthread library mutex facility that utilizes a multiprocessor spinlock.

It should be noted that a lock is between the transmitting or receiving applications and the APN memory services at each node. The lock is not a network wide lock between the transmitting application and the receiving application. Since a single instance of memory is never written to by both the transmitting and the receiving applications there is no need to prevent conflicting writes between the transmitting and receiving applications by using a network wide lock. The transmitting applications and the receiving applications are asynchronous to each other and, if used properly, should not require a network wide lock. Network wide locks would have substantial issues if attempted. For example, if node A locked a local memory from access by node B, node B would be required to wait for the lock to be removed before node B could write data to node A's local memory. If node A powered down prior to releasing the lock on its local memory, node B would potentially have an undetermined wait for the lock to be cleared, if ever.

The transmitting application may update its distributed transmit memory when needed. FIG. 4A illustrates an exemplary process 400 suitable for use in transmitting application 227 of FIG. 3. In FIG. 4A, if the update is not atomic or multiple changes within the distributed memory block are interdependent, then a lock must be performed on the memory prior to the update, and then unlocked afterward. If there are changes to different data elements that are not interdependent, then a lock is not required. When a lock is acquired, the APN memory service is prevented from sending an APN memory refresh to the receiving node until the lock is freed. At block 401, if the transmitting application wishes to do a non-atomic update to the distributed transmit memory, the transmitting application will attempt a lock. At block 402, the APN memory service will evaluate the APN memory service control block to determine if a lock may be granted. If the lock is not able to be granted, the transmitting application reattempts the lock at a later time. When the lock is granted, the transmitting application may proceed to update the distributed transmit memory at block 403. During the period the lock is controlled by the transmitting application, the APN memory services will not be able transmit refreshes to the receiving node so this period should be optimized to be as short as is practical. At block 404, when the update is completed, the transmit application unlocks the APN memory so that the region may be accessed by the APN memory service or other process entities contained within the APN transmitting application that are pending for an update to the APN distributed transmit memory.

For example, if the application is doing a simple posted write of a small size data element, such as writing an application context state byte field to the distributed transmit memory, then a lock is not needed since the write of the data element is atomic. Similarly, if an update has multiple data elements that the distributed application does not view as interdependent, then a lock is not needed. An example of this may be a simple network management protocol (SNMP) with a management information base (MIB) structure where updating the statistics of each element within the MIB structure does not typically have cross dependencies. In both these cases, there is no potential for an APN memory refresh to be transmitted to the receiving application with only a partial change. On the other hand, if the APN distributed transmit memory was to contain two data elements that were interdependent, then a lock would be required. For example, if one data element identified a pixel location and another data element identified the color of the pixel, then these data elements are codependent and a lock should be used for any update to either data element. If a lock was not acquired prior to such a write, there is the potential that the APN memory service may attempt to transmit a refresh after the write of the first element but before the write of the second element was completed by the transmitting application. The result of such an occurrence would be that the receiving application would have an incomplete partial refresh that could have negative ramification.

Similarly, the receiving application may need to lock the APN receive memory block if an access to multiple data elements within are interdependent. The APN distributed receive memory at the receiver node is volatile in that it may be altered by the APN memory process at any time when not under local lock. If a receiving application needs to have an extended period to process data contained within APN distributed receive memory block that has interdependent elements, it may not be practical to do this under lock. In this case, the receiving application applies a local lock on the APN distributed receive memory block, copy the APN distributed receive memory block to a private memory, and then unlock the APN distributed receive memory. The receiving application should not write to APN distributed receive memory block. Such a write could result with data being lost by a future asynchronous writing of the APN distributed receive memory by the APN memory services as a result of a reception of an APN memory refresh received from the transmitting node.

The APN memory transmitting application polls for transmit refresh requests periods. The APN shared memory send service 302 at the transmitting node has, for example, three polling cycles to provide refresh opportunities to registered distributed memories. These poll cycles may be set at 100 ms, 10 ms, and an event poll at a high frequency. The high frequency poll may be at differing intervals dependent on the underlying operating system and hardware platform. In the current implementation, an event poll is called after each packet reception is complete within the APN service.

The APN memory transmitting application provides an indication of refresh request priority. When the transmitting application 227 updates an APN distributed transmit memory 228, the transmitting application 227 may optionally request an immediate refresh be sent out to subscribing nodes. If no update indication is signaled to the APN shared memory send service 302 by the transmitting application, the distributed memory is refreshed at a next request or at an expiration of a maximum duration permitted without a refresh time period, whichever is first. An example of a transmitting application not requiring an explicitly requested refresh of an APN memory is, for example, writes to simple counters for packet counts that do not require high frequency of refresh at receiving nodes. For this type of network statistics, a once per second refresh interval is satisfactory.

If the transmitting application has time sensitive data that must be transmitted faster than a maximum refresh threshold duration, then the application may indicate one of three explicit priorities. Waiting for a maximum refresh threshold duration is considered to be a lowest priority APN memory transmission indication and is implied if no other APN memory transmission indication is specified. An APN memory timely transmission indication is considered to be a next lowest priority for APN memory transmission after the implied maximum refresh threshold duration. A request for APN memory timely transmission indication is used if the transmitting application requests an APN memory refresh at the next 100 millisecond (ms) interval or next opportunity satisfied by higher priority request prior to the next 100 millisecond interval. An APN memory critical transmission indication is considered to be the next lowest priority APN memory transmission after the APN memory timely transmission indication. A request for APN memory critical transmission is used if the transmitting application requests an APN memory refresh at a next 10 millisecond interval or at a next opportunity satisfied by higher priority request prior to the next 10 millisecond interval. APN memory immediate transmission indication is a highest priority request. A request for APN memory immediate transmission is indicated if the transmitting application requests an APN memory refresh at a next high resolution poll opportunity.

If multiple requests are initiated prior to the next poll opportunity, the requests are combined into a single refresh to prevent needless redundant updates. For example, if a timely request is requested, and a critical request is requested, then both requests will be satisfied with a single transmit at the next 10 ms poll. When an APN refresh is performed, the maximum refresh threshold duration period timer is restarted resulting in a period ending in the future timed from the last refresh regardless of what indication priority that refresh was.

A pending transmit priority may be stored in a bitmask field to enable the APN memory services to be more efficient when polling. With multithreaded and multicore implementations, one threaded processor or one multicore processor of the transmitting application may attempt to read, then modify, then write a pending transmit priority bit while another threaded processor or multicore processor of the transmitting application is doing the same. This may result in a data hazard where a refresh priority request is inadvertently lost. As a result, process 414 of FIG. 4B may be used as an exemplary means of locking the bitmask field prior to setting a request priority. FIG. 4B illustrates the exemplary process 414 suitable for use in shared memory send services block 302 of FIG. 3. At block 415, if the transmitting application wishes to transmit a memory location from the distributed transmit memory to remote users, the transmitting application attempts a lock on the memory location. At block 416, the APN memory service evaluates the APN memory service control block to determine if a lock may be granted. If the lock is not able to be granted, the transmitting application reattempts the lock at a later time. When the lock is granted, the transmitting application sets transmit request flags and sets a priority for transmission at block 417. At block 418, after setting the transmission request flags and setting the priority, the transmitting application unlocks the memory location so that it may be accessed by the APN memory service or other process entities contained within the APN transmitting application that are pending for an update to the APN distributed transmit memory.

The transmitting application may be configured to provide multiple frequency thresholds. For example, a maximum duration between updates threshold assures that a receive memory block is updated at the subscribing nodes at no less than once per that duration. If an update takes place because of a refresh request and poll prior to the duration expiring, the refresh duration time start time stamp is retaken and the next interval will take place no longer than that maximum duration in the future from that poll transmit.

A maximum threshold of APN memory refreshes per second is an upper limit of refresh occurrences per second permitted for the APN memory. This threshold does not specify a rate for a scheduler, in that allocated refreshes are not evenly distributed, but rather is treated as a limit. For example, if it was specified that the memory may be updated no more than 5 times a second, all 5 updates may happen within 10 milliseconds followed by 990 milliseconds of no updates. This is achieved by a transmit time table that tracks a cumulative number of refresh times which may be compared to "n" representing a maximum number of refreshes permitted. If a delta of the current requested refresh time and the current-nth refresh is less than one second, the transmission is deferred until the delta exceeds one second. The purpose of this method, versus a rate scheduler method, is to provide the timeliest updates when needed and use the upper threshold only as an occasional limit. If a rate schedule was used, every update may be delayed by a certain period. This would result in a delay for typical and best cases. By comparing to a maximum number of refreshes limit, updates are allowed to take place at a much higher frequency for short durations without delay for the typical or best cases, but at a cost associated with a worse case delay. For most time sensitive applications, this is a very good trade off optimizing for best and typical timeliness.

Figure 4C:
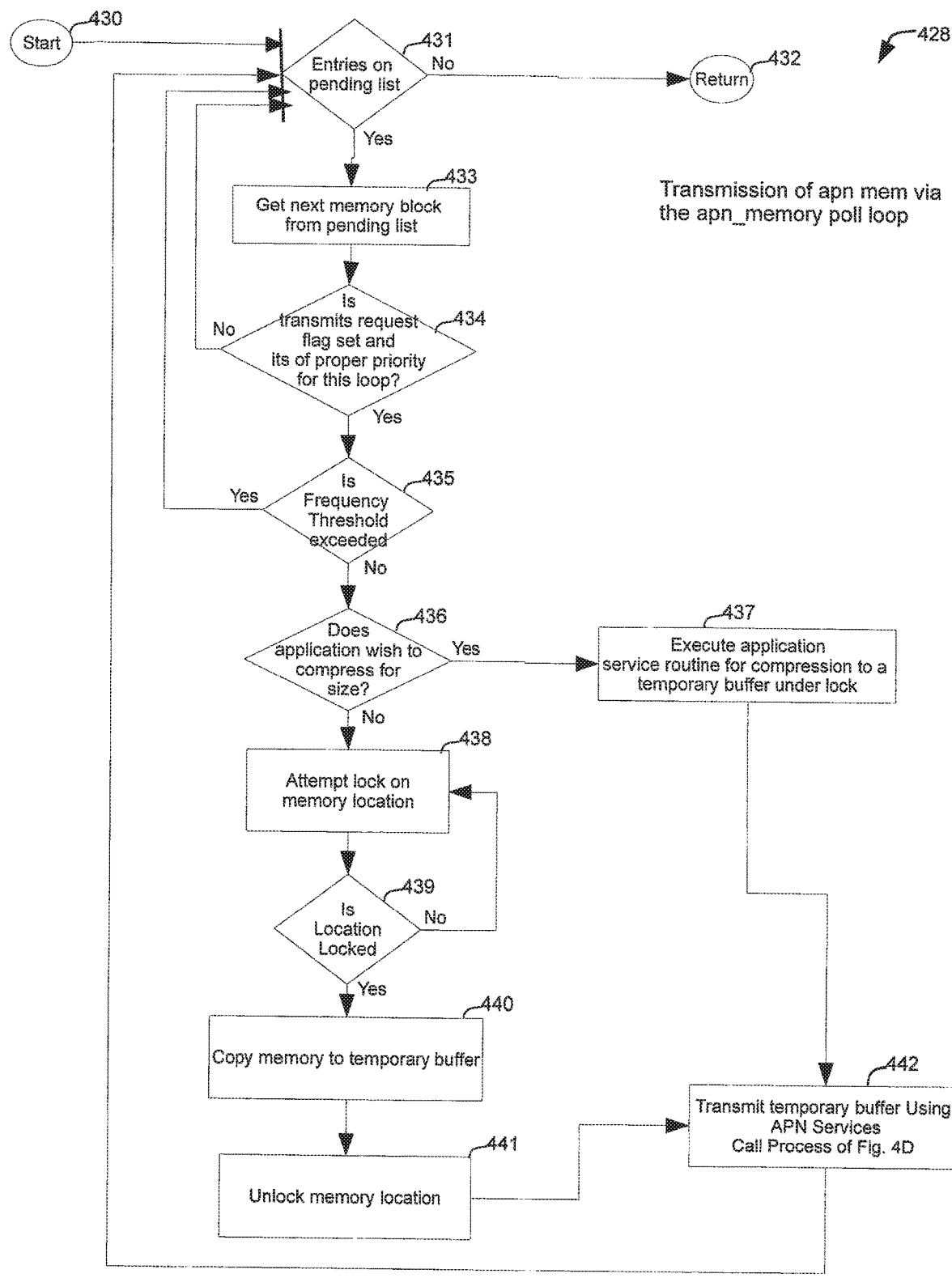

FIG. 4C illustrates an exemplary process 428 suitable for use in the shared memory send messaging block 304 of FIG. 3. At block 430, a process of transmission of an APN memory block via an APN memory poll loop is started. At block 431, a determination is made whether there are transmission request entries on a pending transmission list. If there are no pending transmission requests, the process 428 returns to the initiating routine at block 432. If there are pending transmission requests, the process 428 proceeds to block 433. At block 433, a memory block associated with the next entry in the pending list is allocated for transmission. At block 434, a determination is made whether a transmission request flag is set and the request has appropriate priority for this transmission. If the transmit request flag is not set or the priority is not proper, the process 428 returns to block 431. If the transmission request flag is set and the priority is proper, the process 428 proceeds to block 435. At block 435, a determination is made whether a frequency threshold has been exceeded. If the frequency threshold has been exceeded, the process 428 returns to block 431. If the frequency threshold has not been exceeded, the process 428 proceeds to block 436. At block 436, a determination is made whether the application requests the memory block be compressed. If the memory block is to be compressed, the process 428 proceeds to block 437. At block 437, the compress function 306 is executed and the compressed memory block is saved in a temporary buffer under lock control. At block 442, the temporary buffer is transmitted using the APN send process 310 and described in more detail with regard to FIG. 4D below. After initiating the transmission, the process 428 returns to block 431.

Returning to block 436, if the memory block is not to be compressed, the process 428 proceeds to block 438. At block 438, the memory location associated with the allocated memory block is checked to see if it locked. At block 439, a determination is made whether the attempt made in block 438 indicates the allocated memory is locked. If it is not yet locked, the process 428 returns to block 438. If the allocated memory is locked, the process 428 proceeds to block 440. At block 440, the allocated memory is copied to a temporary buffer. At block 441, the allocated memory location is unlocked. At block 442, the temporary buffer is transmitted using the APN send process 310 and as described in more detail with regard to FIG. 4D below. The process 428 then returns to block 431.

Figure 4D:
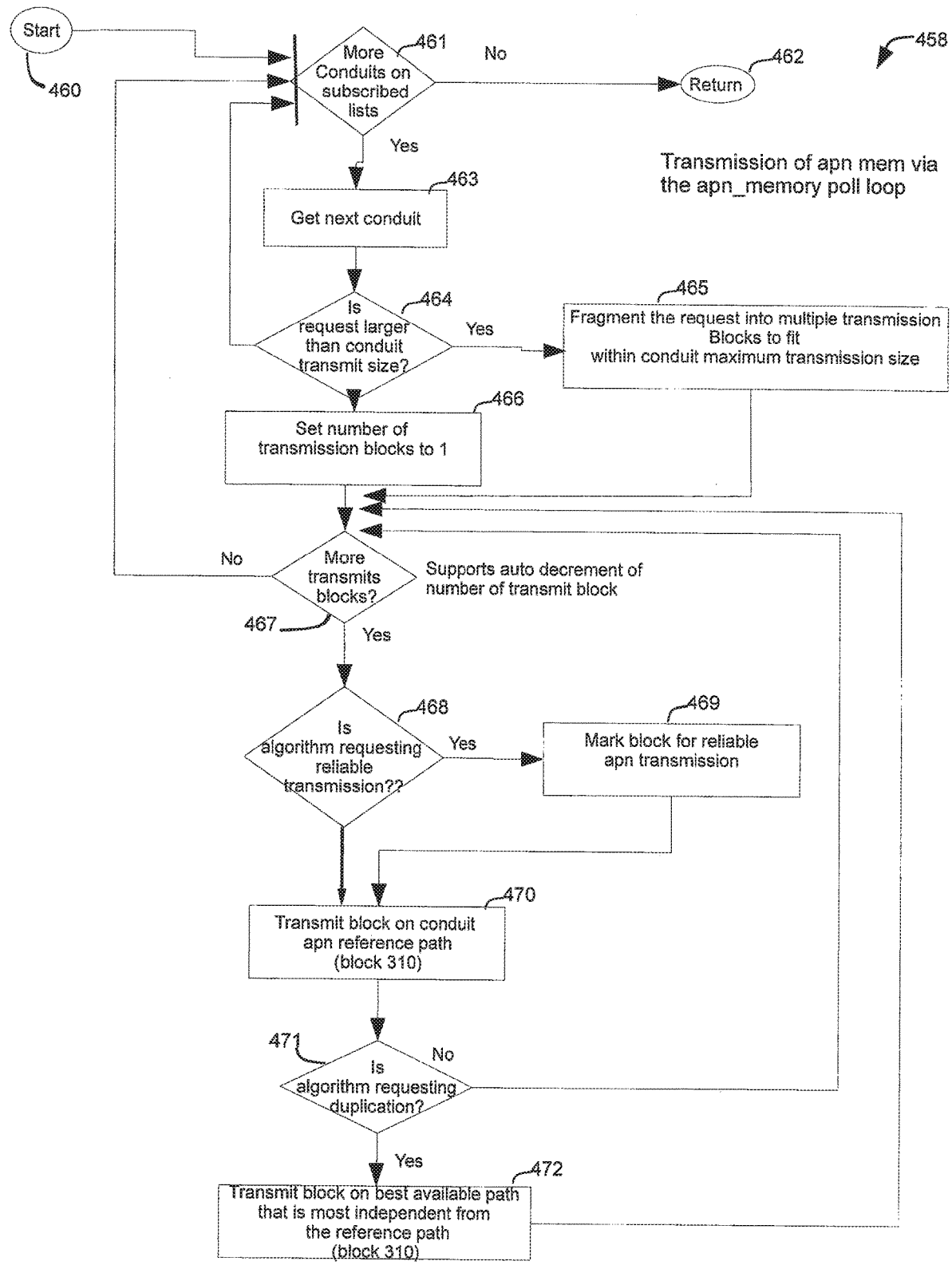
Figure 5A:
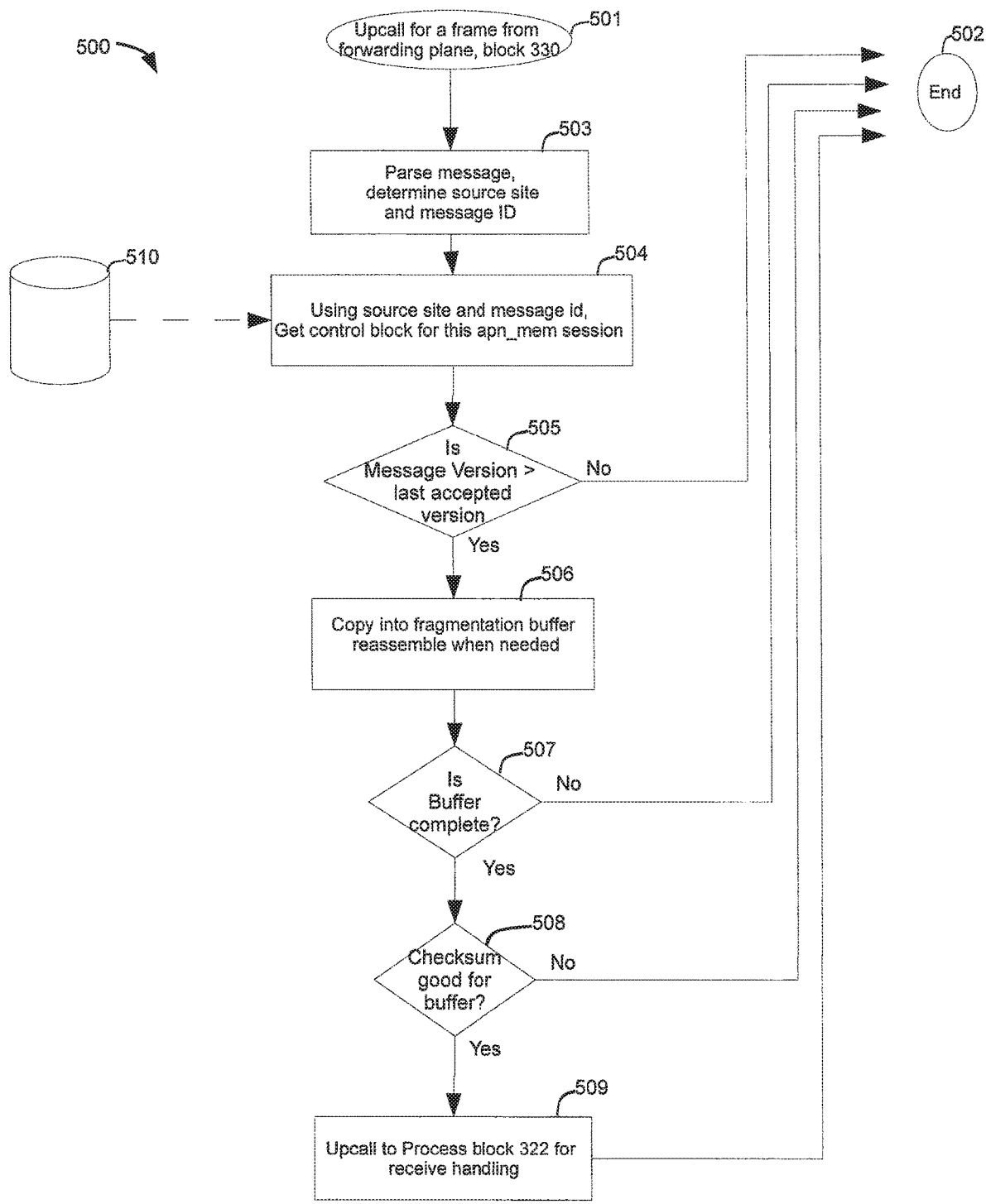
FIGS. 5A and 5B illustrate a shared memory block receiving process in operation at a receiver node in accordance with the present invention.
Figure 5B:
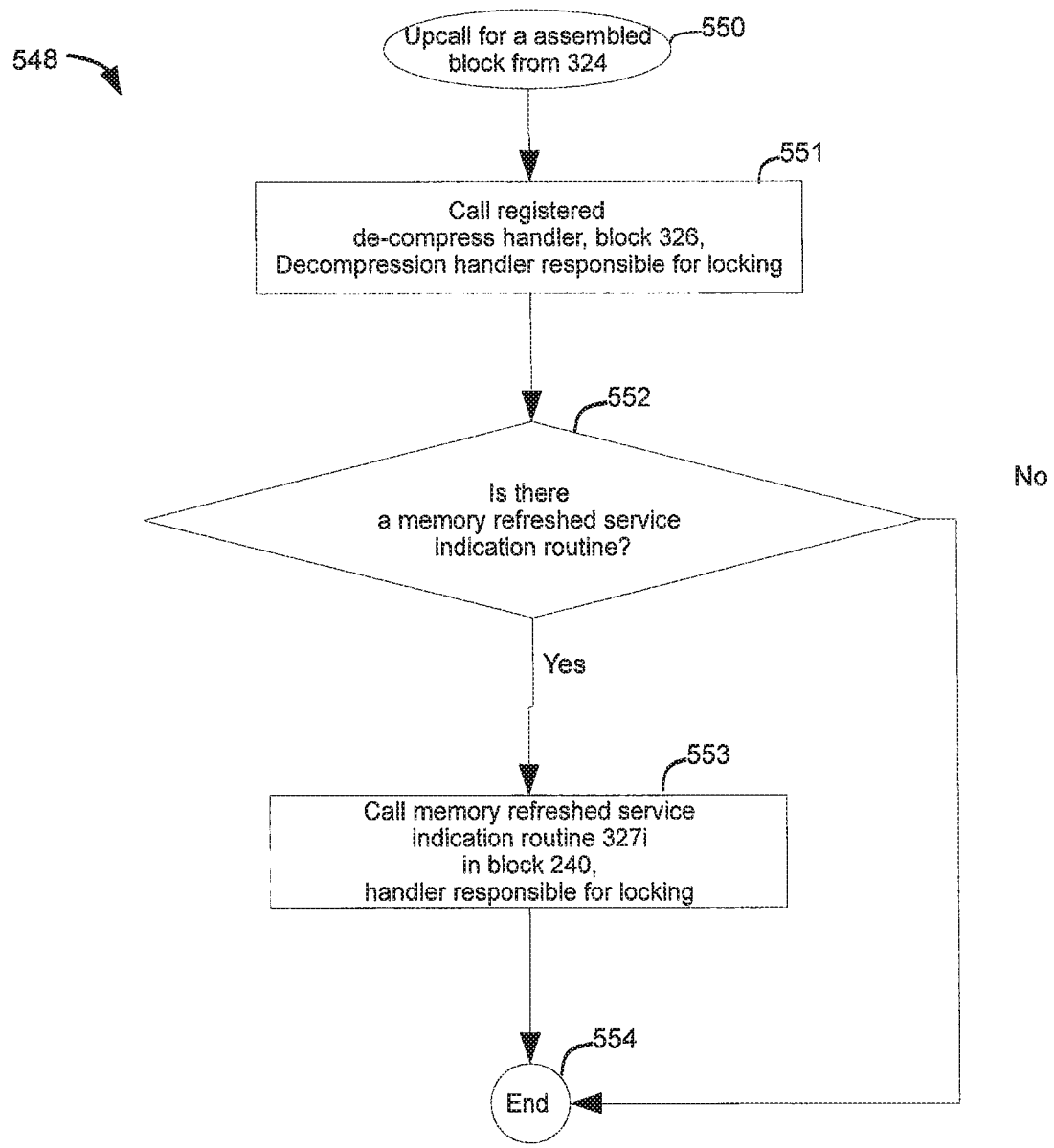

FIG. 4D illustrates an exemplary process 458 suitable for use in the APN send process block 310 and associated with the shared memory send messaging block 304 of FIG. 3. At block 460, a process of transmission of APN memory blocks via the APN memory poll loop is started. At block 461, a decision is made whether there are available transmission conduits on a subscribed list of conduits. If there are no available transmission conduits, the process 458 returns to the initiating routine at block 462. If there are available transmission conduits, the process 458 proceeds to block 463. At block 463, the process 458 selects a next available conduit. At block 464, a determination is made whether the requested block of memory is larger than the selected conduit transmission size. If the requested block of memory is larger than the selected conduit transmission size, the process 458 proceeds to block 465. At block 465, the block of memory is fragmented into multiple transmission blocks to fit within the conduit maximum transmission size. Further details on fragmentation may be found in U.S. patent application Ser. No. 12/482,766 filed Jun. 11, 2009 entitled "Flow-based Adaptive Private Network with Multiple WAN-Paths", for example in FIGS. 1H, 3A-C, and 4 and at page 9, line 20 to page 11, line 2, at page 21, line 18 to page 30, line 5, and at page 45, line 11 to page 46, line 7. The process 458 then proceeds to block 467. Returning to block 464, if the requested block of memory is not larger than the selected conduit transmission size, the process 458 proceeds to block 466. At block 466, the number of transmission blocks is set to one. At block 467, a determination is made whether there are more blocks to transmit. If there are no more blocks to transmit, the process 458 returns to block 461. If there are more blocks to transmit, such as the single block according to block 466, the process 458 proceeds to block 468. At block 468, a determination is made whether the transmission application has requested reliable transmission. If the transmission application has requested reliable transmission, the process 458 proceeds to block 469. At block 469, the block of memory is marked for reliable APN transmission and the process 458 proceeds to block 470. Returning to block 468, if reliable transmission has not been requested, the process 458 proceeds to block 470. At block 470, the block of memory is transmitted on the selected conduit APN reference path, as coordinated and controlled by the APN send process 310. Further details of APN transmission may be found in U.S. patent application Ser. No. 12/482,766 filed Jun. 11, 2009 entitled "Flow-based Adaptive Private Network with Multiple WAN-Paths", for example in FIGS. 1H-J, 2, and 3A-C and at page 9, line 20 to page 18, line 17 and at page 21, line 18 to page 36, line 20. At block 471, a determination is made whether the transmitting application is requesting duplication. If the transmitting application is not requesting duplication, the process 458 returns to block 467. If the transmitting application is requesting duplication, the process 458 proceeds to block 472. At block 472, the block of memory is also transmitted on a best available path that is most independent from the selected conduit reference path and then the process 458 returns to block 467. Further details of duplicate transmission may be found in U.S. patent application Ser. No. 12/482,766 filed Jun. 11, 2009 entitled "Flow-based Adaptive Private Network with Multiple WAN-Paths", for example in FIG. 3C and at page 31, line 18 to page 36, line 20.

This section addresses the APN memory services use of versioning for APN memory refreshes. Each APN memory refresh update is marked with an appropriate version at the transmission node in the order the refreshes are transmitted by the APN transmitting node. A version tag may include, for example, a time stamp or, alternatively, a version number that is incremented with each new update. The receiving node tracks the update versions it receives. If the receiving node receives an update that is of earlier version, the update is ignored. The APN memory facility is configured to operate based on a rule that memory refreshes are cumulative. Any one APN memory refresh may be lost if the update was received out of order. The APN memory facility is ideal for real time status and statistics updating.

FIG. 5A illustrates an exemplary process 500 suitable for use in the shared memory receive messaging block 324, in a receiver node 222, of FIG. 3. At block 501, an upcall is received for a frame from the APN receive process $330_i$. At block 503, a received message is parsed to determine a source site and message identification (ID). At block 504, a control block is selected from database 510 based on the received source site and message ID appropriate to receive a memory block transmission. At block 505, a determination is made whether the message version is greater than the last accepted version. If the message version is not greater than the last accepted version the message is a duplicate message and the process can be stopped at block 502. If the message version is greater than the last accepted version, the process 500 proceeds to block 506. At block 506, the received message data is copied into a fragmentation buffer and if needed reassembled. At block 507, a determination is made if the buffer is complete indicating all fragments of the memory block have been received. If all of the fragments have not been received, the process 500 stops at block 502, until the next fragment is received. If all of the fragments have been received, the process 500 proceeds to block 508. At block 508, a determination is made whether a checksum operation on the data in the buffer indicates no errors. If errors are found the process 500 stops at block 502. If there are no errors, the process 500 proceeds to block 509. At block 509, an upcall is placed to shared memory receive services block $322_i$ for receive handling of the memory block transmitted.

FIG. 5B illustrates an exemplary process 548 suitable for use in the shared memory receive services block $322_i$ in a receiver node $222_i$ of FIG. 3. At block 550, the upcall from block 509, shared memory receive messaging block $324_i$, is received in the shared memory receive services block $322_i$. At block 551, the upcall is registered and the decompress function $326_i$ is called. For example, the decompress function $326_i$ may also be responsible for locking. At block 552, a determination is made whether there is a memory refreshed service indication routine to be invoked. If there is no memory refreshed service indication routine, the process 548 stops at block 554. If there is an appropriate memory refreshed service indication routine, the process 548 proceeds to block 553. At block 553, a receive memory update handler in receiving application $240_i$ is called. If the memory refreshed service indication routine's access to the distributed receive memory requires the memory to be non-volatile to changes by subsequent memory refreshes during the period the service routine is processing, the service routine will be responsible for locking the distributed receive memory as noted prior for the receiving application use in general. The process 548 stops at block 554.

Figure 6:
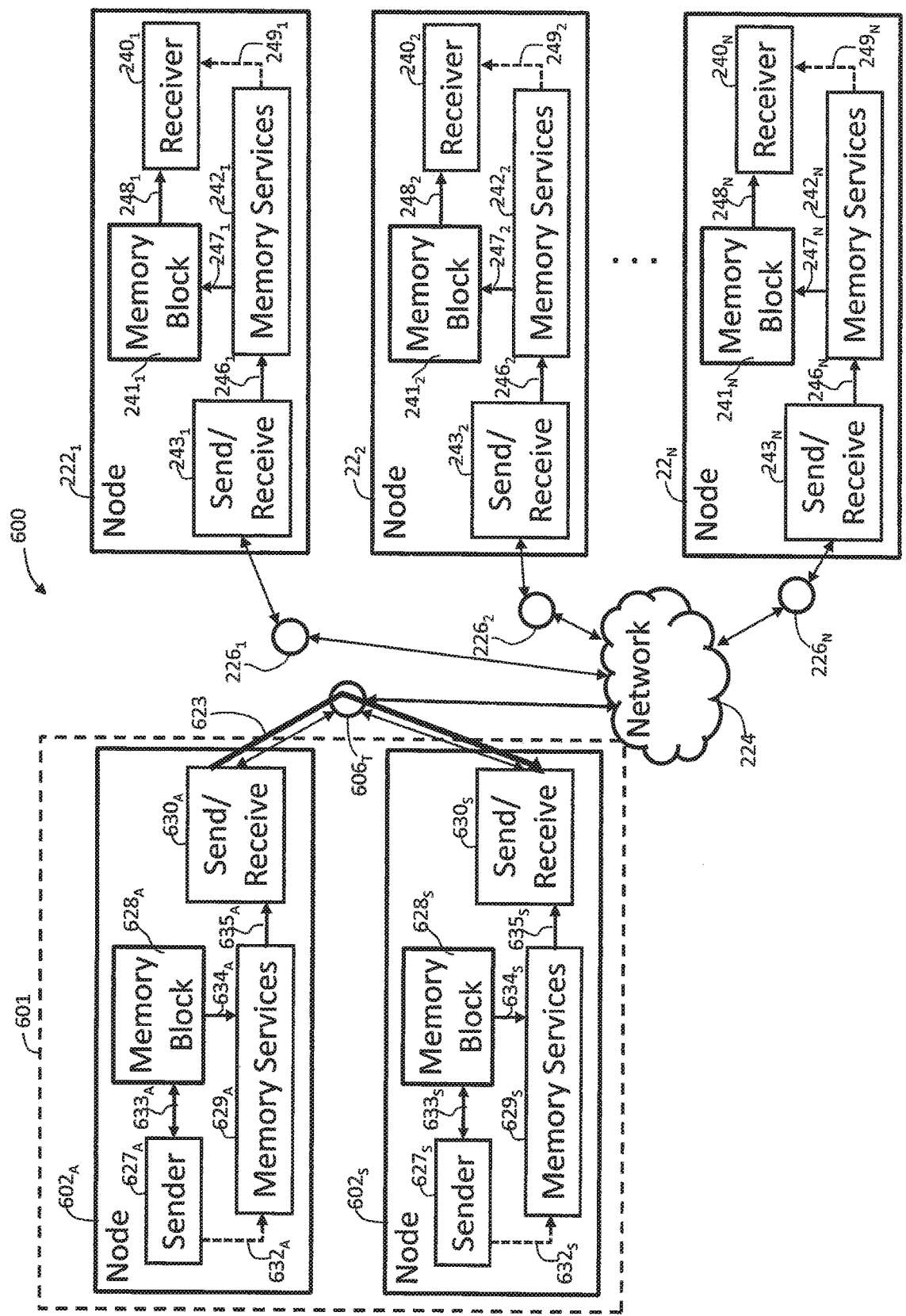
FIG. 6 illustrates a high availability (HA) network configuration having an active node, a standby node, and a plurality of receiver nodes using send/receive transport reliable protocol (TRP) blocks in accordance with the present invention.

FIG. 6 illustrates a high availability (HA) network configuration 600 having an active node $602_A$, a standby node $602_S$, and a plurality of receiver nodes $222_1, 222_2, \ldots, 222_N$ using send/receive transport reliable protocol (TRP) blocks $630_A, 630_S, 243_1, 243_2, \ldots,$ and $243_N$ in accordance with the present invention. A high availability site 601 deploys two nodes with one node configured to operate in an active state, the active node $602_A$, and the other node configured to operate in a standby state, the standby node $602_S$. The active node $602_A$ performs all node functions, such as described above with regard to node 202 of FIG. 2B. The standby node $602_S$ monitors the state of the active node $602_A$ and in the event of a failure of the active node $602_A$ takes over the active node operations. The distributed shared memory services of the present invention are used by the active node $602_A$ and the standby node $602_S$ to communicate their operational status information to each other. A redundant control protocol (RCP) state machine operates in both active and standby nodes to communicate between the redundant nodes for the purposes of exchanging information necessary to elect the active node and monitor the health of both nodes. Such exchange of information is facilitated by use of point-to-point memory synchronization communicating a common memory type. The send/receive blocks $630_A, 630_S, 243_1, 243_2, \ldots,$ and $243_N$ provide reliable transmission across a network, control the transmitting of packets and retransmitting of packets as required, controls the receiving and acknowledging of packets, and supports packet duplication for reliable transmission.

A detailed use case of the APN memory facility is described including how it uses the unique underlying APN services as well as how it is used by the APN services.

The operation of the adaptive private network uses the APN nodes at WAN egress to monitor and analyze all traffic as it is transmitted and received across the different wide area networks for latency, jitter, loss, and congestion for each path. The WAN egress nodes of the APN communicate to the WAN ingress nodes the results of the analysis so that the WAN ingress nodes may use the information to direct traffic across the network in a highly reliable timely way. The reports of the network behavior are referred to as APN quality reports, or conduit quality reports. Included within the quality reports are individual quality reports for each path associated with the conduit which are referred to as path quality reports, information on each WAN link, referred to as WAN link quality reports, and information on the conduit as a whole. Information in the path quality report includes counts of packet received, packets lost, bytes received, bytes lost, operational state indication, latency, and jitter. Information in the WAN link quality report includes bytes received, bandwidth permitted, and congestion indication. Information within the conduit quality report for the conduit as a whole contains maximum transmission unit permitted, lowest latency observed, and bandwidth permitted.

If the quality reports were not propagated from the WAN egress node to the WAN ingress node in a timely and reliable way, the APN would not generally be able to adapt and converge to rapid changes in the wide area networks that the APN is utilizing for communication. When the APN node propagates a quality report to its peer, the APN node updates the distributed transmit memory with the current analysis of the conduit's paths and their WAN links.

The APN node may indicate to the APN memory services a refresh request priority. The priority of the refresh request is highly correlated to the type of information that is being propagated. For example, if the APN node is updating packet receive counters, the APN memory refresh is not considered to be time critical. For this use, the APN node generally does not issue any refresh request priority indication. The refresh is issued by the APN memory services after waiting for the maximum refresh threshold duration to expire or if the refresh is otherwise satisfied by higher priority request prior to the maximum refresh threshold duration expiring. On the other hand, if the information to be propagated is of a higher priority, such as the detection that a path has become non-operational, the refresh request priority is generally set to an immediate transmission indication. This results in the APN memory refresh being transmitted at the very next opportunity. The result is the APN memory refresh is received by the APN node at the WAN ingress location and permits the node to divert traffic away from the non-operational path faster.

The quality reports contain data about various paths and WAN links. The data in the quality report memory is generally stored in a sparse format that is optimized for fast table record access and retrieval via indexing into fixed offset in the memory region. Although efficient for processing time this comes at a cost of additional space needed for the quality reports storage in memory. This is compared to a potential more packed format which would utilizes less memory but require more indirect accesses to records via a hash table of alternative data structures, for example. The choice in the present implementation is to use a sparse format in memory since that is more efficient for packet processing routines to access. The consequence of this choice could be a very large distributed memory that will consume substantial amount of network bandwidth as memory refreshes are propagated across the network. As noted prior, the quality reports are transmitted using the APN duplicate and reliable services, so the bandwidth consumed is greater as a result. To provide a more optimal solution, the APN utilizes a pack and an unpack utility as its APN memory compression and decompression service routines. The pack routine at the transmitting node takes the sparsely populated APN quality report memory and restructures the data layout into a much more space and transmission efficient tightly packed format. The decompression service routine on the receiving node unpacks the memory refresh and returns it to its un-packet less efficient for space and transmission but more efficient for processing a sparse format.

Even though the packed format of the quality reports is substantially smaller than they would be if transmitted unpacked, the size of the quality reports typically exceed a maximum transmission unit permitted over the wide area networks available. In this case, the memory refresh associated with the quality report is fragmented and transmitted across the WAN network on one or more paths between the APN nodes. At the receiving APN node the APN refresh is reassembled from the fragments. The benefit is the aggregated bandwidth of the available wide area networks are able to be utilized for the quality reports.

The quality reports contain within them WAN link quality reports. Elements of these quality reports contain information pertaining to the maximum transmission rate permitted for various WAN links. Upon reception at the WAN ingress APN node, the traffic schedules contained for each WAN link may need to be adjusted as a result of the new data available in the quality report. When the APN memory service receives a memory refresh and has defragmented and unpacked, decompressed, the refresh, the APN memory services invokes the memory refreshed service indication routine. Contained within the service routine is logic that locks the distributed receive memory and then adjust the schedulers to match the permitted rate requested, and then unlock the distributed receive memory and then ends the service routine.

A level of congestion of a WAN link may be detected by constant monitoring of the arrival rate of messages from the WAN link, accounting for data and periods of no data, referred to as holes versus an idealized anticipation of a model of the WAN link's ability to receive at WAN egress node.

One approach to controlling the level of congestion in accordance with the present invention is through the use of a network clock in frame tagging and rate comparison. For example, 32 bit network time timestamps of microsecond (us) granularity, for example, may be used. The network time is a high resolution clock sync maintained across the network, as further addressed in U.S. application Ser. No. 12/482,766 incorporated by reference herein in its entirety. By using the 32 bit time stamp, the sending WAN ingress node and receiving WAN egress node can use a reference clock of estimated microsecond granularity. The 32-bit time stamp provides improved granularity of control compared to a 16-bit time stamp for example. It is appreciated that other levels of granularity may be used.

This does not mean that the clock sync is of microsecond synchronization. It only means that the clock is used to estimate the network time in microseconds. If there is a drift of up to a millisecond, this error would be quickly resolved because of the clock calibration algorithm and any impact of a temporary drift would be minimal to this algorithm.

The current invention alters the WAN ingress scheduler's rate, via the means documented in U.S. application Ser. No. 12/482,766, for example. The use of rate changes on WAN egress may be utilized to detect, to adjust, and to more precisely measure congestion in many situations.

In accordance with the present invention, congestion is tracked on each independent path from WAN ingress to WAN egress. Rather than having one tracking control block for each egress WAN link, each path is tracked independently. The packet stream applies a more refined filter that prevents loss of data which may be considered significant. When detecting if congestion is occurring, all the paths are analyzed.

An exemplary 100 ms period is used in a running time sample table, to analyze congestion. By summing into 100 ms samples, and then utilizing a time sample table, we can compare the behavior vs. fixed time periods. In the current implementation, the sample table contains 10 samples with their duration included with each sample. Whenever used, the summation value is adjusted to be a rate of change per second value.

An exemplary approach to dealing with congestion and to minimize its effects is as follows. Packet reception at the congestion detection algorithm:
1. A packet is received, it's received time in local clocks is noted
2. The path context control block is fetched for the packet
3. the packet's receive time in microseconds (us) is converted to network time in microseconds 4. the packet's transmit time in network time is exacted from the packet
5. The packets size, converted to account for WAN link overhead and quantum is added to path running count of bytes received.
6. if the packet is the first packet received,
   a. packets receive time in local time us is recorded
   b. the transmit time in network time us is recorded
   c. the current running count of bytes is recorded in the current sample
   d. the subroutine exits
7. the send time delta network time us is calculate by delta between the last recoded send time in network time us and this packet's send time in network time us is calculated.
8. The receive time delta us is calculated by delta between the last recoded receive time in local us, converted to network time us, and this packet's receive time in network time us is calculated. The storing of arrival times in local time and converting them later to network time allows for the network time to be continually adjusted after the recording. It is best to convert local time to network time at the last possible instant before its use since a new the network clock is always better than an older one when used at the present.
9. If the send time delta network time us is a negative number, the packet has arrived out of order.
   a. The subroutine exits and the packet is not added to the sample period.
10. The send rate is calculated by dividing 1 million by the send time delta in network us.
11. The receive rate is calculated by dividing 1 million by the receive time delta in network us.
12. The send rate and receive rates are converted to Kbits per second resolution with double floating point precision.
13. If the send rate or receive rate are above the physical limits of the WAN link,
   a. The subroutine exits and the packet is not added to the sample period. On the WAN egress side, this can happen if, after the WAN egress WAN link, a burst of packets is sent to the node because of temporary delay at an intermediate device. This means that we have lost any ability to use this data, since it was jittered post WAN link. On the send side, the APN will occasional schedule critical packets faster than the WAN link configured rate. If used, these could result in perception of congestion when actually the WAN link was doing proper scheduling.
14. If the send delta times or the receive delta times are of extreme duration, the packet is treated as the first packet of the flow. This could be the result of the remote node being reset or even replaced.
   a. packets receive time in local time us is recorded
   b. the transmit time in network time us is recorded
   c. the current running count of bytes is recorded in the current sample
   d. the subroutine exits
15. send_vs_receive_delta_nus is calculated by subtracting the receive delta time network us (nus) from the send delta time nus. This shows the instantaneous trend of the congestion. If the packet is received with less delta than the send, congestion is being reduced. If the packet has more congestion, congestion may be occurring. This also shows jitter in the networking as well, so the system does not over react to a single instance.
16. If the packet is a valid sample, the send_vs_receive_delta_nus value is added into the current samples running for congestion.
17. If the sample duration is over 100 ms,
   a. the sample is added into the long duration sample table for this path
   b. the sample is reinitialized to start a new sample period
18. Return An exemplary approach to 100 ms poll congestion detection is as follows:
1. for all the paths for a WAN link from a particular conduit
   1. if the path has received samples
      a. Calculate the rate of change per networking us over the period covered by the sample table using double precision floating point. Adjust the rate of change to be rate of change over a second.
      b. If the negative rate of change in network time is greater than a configure threshold, congestion is detected on this path. In the current implementation, the default setting is −20 ms per second rate of change between receive rate and send rate but is configurable.
2. If all operational paths for a conduit are indicating congestion, the WAN link is considered congested. If any operational path for a conduit is not congested, the WAN link is not considers congested.
3. WAN link congestion will not be indicated for the WAN link if no path using the WAN link has been sampling for greater 500 ms.
4. Return An exemplary approach to 100 ms poll for WAN link congestion mitigation is as follows:
1. Calculate the measured receive rate for all paths on a conduit for this 100 ms period.
2. Adjust the calculated rate to Kbits per second using double floating point precision.

An exemplary approach to congestion exit detection is as follows:
1. If WAN link in congestion monitoring state
   a. if
      i. congestion was not detected in current sample
      ii. And no congestion has been detected for 200 ms
      iii. And the WAN link received rate is 90% of the permitted congestion flag for WAN link
         1. WAN link is no longer in congested state and congestion rate adjustment do not need to be done An exemplary approach to congestion rate adjustment is as follows:
1. if WAN link congested just detected in this 100 ms period
   a. Set rate factor to 80%
2. else if last 100 ms WAN link received rate is greater than 120% of permitted rate
   a. set rate factor to 90%, since this shows we are gradually reducing congestion
3. else If last 100 ms WAN link received rate is greater than 105% of permitted rate
   a. set rate factor to 100%, since this shows we are have reduced congestion
4. else
   a. Set rate factor to 110% since this shows he rate has been reduced below our configured scheduled rate.
5. Adjust the permitted rate to be the last 100 ms measured received rate multiplied by the rate factor 6. Signal the rate adjustment to the WAN ingress node When congestion is detected on a WAN link, the permitted rate the WAN ingress node is allowed to transmit to the WAN egress node via the congested WAN link is adjusted up to every 100 ms based on measurement of the receive rates of the network versus the previously prescribed permitted transmit rate. When the measured received rate is between within 105% and 110% of the permitted rate, congestion is being mitigated so no adjustment is done. When the measured rate is significantly above the permitted rate (120%), the congestion is being drained, but we have a substantial backlog so the rate is adjusted down in 10% increments against the current measured rate level per 100 ms period. When the measured received rate is significantly below the permitted rate, congestion may be letting up or the WAN ingress node no longer has much data to send, so increases of the permitted rate are allowed in 10% increments per 100 ms period against the current measured rate.

Assuming a WAN link is used that is 100 kbps in size, in which congestion has been detected, and the measured received rate is 50 kbps. Initially, the permitted rate of the WAN link is reduced to 80% of the last sampled received rate of the WAN link. For this example, the adjustment would set the new permitted rate to (0.8*50 kbps) 40 kbps. If congestion is detected in future 100 ms checks, the permitted rate is continued to be adjusted. If in subsequent 100 ms checks, the measured rate stays significantly above the current permitted rate, the algorithm still incrementally reduces the permitted rate to 90% of the measured received rate for that 100 ms. If a receive rate is measured to be 45 kbbps, the rate would then be adjusted down to 40.5 kbps. If the receive measured data rate is below the permitted rate, then the congestion may be easing so the current permitted rate may be increased. If the measured data rate falls to 30 kbps, then the current permitted rate would be increased by 110% of measured rate, or, for example, 33 kbps. It is possible this improvement in data rate was caused by the congestion situation being eliminated or by WAN ingress node no longer having substantial data to send to the WAN link. In practice, under congestion mode operation, the rate adjustments will cycle the rates up and down about the rate at which an actual congested link is able to transmit data without substantial delay until the incident that caused the congestion is resolved.

Among its several aspects, this invention reduces the effect of network bandwidth, packet loss, congestion, jitter, and latency, from being a factor for highly responsive distributed applications across the public Internet. The invention also greatly increases the probability for its successful application across a greater number of typical networks and applications uses where timeliness and responsiveness are required. While the present invention has been disclosed in the context of various aspects of presently preferred embodiments, it will be recognized that the invention may be suitably applied to other environments consistent with the claims which follow.

We claim:

1. A method for using distributed shared memory for communicating between distributed computing systems, the method comprising:

configuring a first node in an adaptive private network (APN) as a transmitting node having a first memory block that is shared in subscribed receiving nodes;

configuring a second node in the APN as a first subscribed receiving node that includes a second memory block that is shared with the first memory block;

configuring a third node in the APN as a second subscribed receiving node that includes a third memory block that is shared with the first memory block;

upon receiving an indication in the first node that the first memory block has been changed, initiating in the first node a memory refresh of the shared memories in the subscribed receiving nodes;

according to an APN path quality report, determining multiple paths in the APN that are available for communication in the distributed computing systems, that are as independent as possible, that are of high quality having low latency compared to other paths in the APN; and transmitting from the transmitting node across the determined multiple paths a memory refresh of the memory contents that have changed in the first memory block using a first duplicate transmission to the first subscribed receiving node to update the second memory block and using a second duplicate transmission to the second subscribed receiving node to update the third memory block.

2. The method of claim 1 further comprising:

determining multiple paths in the APN that are available for communication, that have low loss and low jitter compared to other paths in the APN.

3. The method of claim 1, wherein the memory refresh is delivered across the determined multiple paths at lower typical latency, lower loss, lower jitter and higher availability than using only one path to each subscribed receiving node for the transmission of the memory refresh.

4. The method of claim 1 further comprising:

configuring the first memory block with a refresh polling time that is restarted after the immediate memory refresh has completed.

5. The method of claim 1, wherein the first duplicate transmission comprises:

transmitting the memory refresh across a first determined path of the determined multiple paths to the first subscribed receiving node; and transmitting a duplicate of the memory refresh across a second determined path of the determined multiple paths to the first subscribed receiving node.

6. The method of claim 1, wherein the second duplicate transmission comprises:

transmitting the memory refresh across a third determined path of the determined multiple paths to the second subscribed receiving node; and transmitting a duplicate of the memory refresh across a fourth determined path of the determined multiple paths to the second subscribed receiving node.

7. The method of claim 1 further comprising:

marking at the transmitting node each memory refresh with a version number in the order the memory refreshes are transmitted; and rejecting a currently received memory refresh in a subscribed receiving node if the version number of the currently received memory refresh is an earlier version than an already received memory refresh.

8. The method of claim 1 further comprising:

storing the APN path quality report in a sparse format that is optimized for fast table record access; and restructuring the APN path quality report from the sparse format to a more tightly packed format to reduce the time it takes to transmit the APN path quality report.

* * * * *